United States Patent
Yoshida

(10) Patent No.: US 6,169,608 B1
(45) Date of Patent: Jan. 2, 2001

(54) METHOD OF CONVERTING CONTINUOUS TONE COLOR IMAGE INTO PSEUDO-HALFTONE BINARY COLOR IMAGE

(75) Inventor: Yasunari Yoshida, Aichi-ken (JP)

(73) Assignee: Brother Kogyo Kabushiki Kaisha, Nagoya (JP)

( * ) Notice: Under 35 U.S.C. 154(b), the term of this patent shall be extended for 0 days.

(21) Appl. No.: 08/998,670

(22) Filed: Dec. 29, 1997

(30) Foreign Application Priority Data

Dec. 27, 1996 (JP) .................................................. 8-350799

(51) Int. Cl.⁷ ........................................................ H04N 1/46
(52) U.S. Cl. .......................... 358/1.9; 358/534; 358/456; 358/457
(58) Field of Search .............................. 395/109; 358/534, 358/535, 456, 457, 1.9, 448, 536; 382/252, 270

(56) References Cited

U.S. PATENT DOCUMENTS 5,031,050   7/1991   Chan ..................................... 358/457
5,822,502 * 10/1998   Li et al. ............................... 395/109

OTHER PUBLICATIONS

"The Void–And–Cluster Method for Dither Array Generation", Robert Ulichney, SPIE, vol. 1913, p. 36, lines 13–16.

* cited by examiner

*Primary Examiner*—Thomas D. Lee
(74) *Attorney, Agent, or Firm*—Oliff & Berridge, PLC

(57) ABSTRACT

For each of the color components of an inputted continuous tone color image, densities of the pixels are successively compared with a threshold value, thereby converting the pixels into ON or OFF. A binary conversion error obtained during this conversion operation is distributed to neighboring pixels. A printing prohibiting matrix is previously set to determine several pixels to be compulsively turned OFF. The error diffusion conversion process is attained with using the printing prohibiting matrix, thereby reducing the number of turned ON pixels and limiting the amount of ink to be ejected.

24 Claims, 16 Drawing Sheets

FIG. 4 (a)

|  | M=0 | M=1 | M=2 | M=3 |
|---|---|---|---|---|
| N=0 | ○ | × | ○ | ○ |
| N=1 | ○ | ○ | ○ | × |
| N=2 | ○ | × | ○ | ○ |
| N=3 | ○ | ○ | ○ | × |

|  | M = 0 | M = 1 | M = 2 | M = 3 |
|---|---|---|---|---|
| N = 0 | T 1 | 0 | T 2 | T 3 |
| N = 1 | T 4 | T 5 | T 6 | 0 |
| N = 2 | T 7 | 0 | T 8 | T 9 |
| N = 3 | T 10 | T 11 | T 12 | 0 |

|   | M=0 |   |   |   |   |   |   | M=7 |
|---|---|---|---|---|---|---|---|---|
| N=0 | 1 |  | 13 |  | 3 |  | 15 |  |
|  |  |  |  |  |  |  |  |  |
|  | 9 |  | 5 |  | 11 |  | 7 |  |
|  |  |  |  |  |  |  |  |  |
|  | 4 |  | 16 |  | 2 |  | 14 |  |
|  |  |  |  |  |  |  |  |  |
|  | 12 |  | 8 |  | 10 |  | 6 |  |
| N=7 |  |  |  |  |  |  |  |  |

|   | M=0 |   |   |   |   |   |   | M=7 |
|---|---|---|---|---|---|---|---|---|
| N=0 | X |  |  |  | X |  |  |  |
|  |  |  |  |  |  |  |  |  |
|  |  |  | X |  |  |  | X |  |
|  |  |  |  |  |  |  |  |  |
|  | X |  |  |  | X |  |  |  |
|  |  |  |  |  |  |  |  |  |
|  |  |  | X |  |  |  | X |  |
| N=7 |  |  |  |  |  |  |  |  |

DmC'

| 3 | × | 2 | × |
|---|---|---|---|
| 11 | 7 | 10 | 6 |
| 1 | × | 4 | × |
| 9 | 5 | 12 | 8 |

DmM'( )

| 11 | × | 10 | × |
|---|---|---|---|
| 7 | 3 | 6 | 2 |
| 9 | × | 12 | × |
| 5 | 1 | 8 | 4 |

DmY'( )  Dmi'( ) (i=C, M, Y)

| 7 | × | 6 | × |
|---|---|---|---|
| 3 | 11 | 2 | 10 |
| 5 | × | 8 | × |
| 1 | 9 | 4 | 12 |

×: PRINT PROHIBITED POSITION
 (=THRESHOLD VALUE "0")

FIG. 8 (b)

DmC( )

| 3 | 15 | 2 | 14 |
|---|---|---|---|
| 11 | 7 | 10 | 6 |
| 1 | 13 | 4 | 16 |
| 9 | 5 | 12 | 8 |

DmM( )

| 11 | 15 | 10 | 14 |
|---|---|---|---|
| 7 | 3 | 6 | 2 |
| 9 | 13 | 12 | 16 |
| 5 | 1 | 8 | 4 |

DmY( )  Dmi( ) (i=C, M, Y)

| 7 | 15 | 6 | 14 |
|---|---|---|---|
| 3 | 11 | 2 | 10 |
| 5 | 13 | 8 | 16 |
| 1 | 9 | 4 | 12 |

FIG. 16

|  | i = −2 | i = −1 | i = 0 | i = 1 | i = 2 |
|---|---|---|---|---|---|
| j = −2 | 1/48 | 3/48 | 5/48 | 3/48 | 1/48 |
| j = −1 | 3/48 | 5/48 | 7/48 | 5/48 | 3/48 |
| j = 0 | 5/48 | 7/48 | ✶ |  |  |

~Cmat( )

SUBJECT PIXEL
PIXEL POSITION (x, y)

METHOD OF CONVERTING CONTINUOUS TONE COLOR IMAGE INTO PSEUDO-HALFTONE BINARY COLOR IMAGE

BACKGROUND OF THE INVENTION

1. Field of the Invention

The present invention relates to a method of converting a color continuous tone image into a pseudo-halftone color image.

2. Description of Related Art

There has been proposed a color printer capable of printing color images with color ink.

SUMMARY OF THE INVENTION

When desiring to obtain a high quality print output, it is conceivable to increase resolution, at which the image is to be printed. For example, when desiring to print a high quality color image, a color printer is controlled at a resolution of 720 dpi, which is higher than a normal resolution of 360 dpi that is used at a normal printing operation.

At a certain region represented by image data to print all dots therein, the number of dots printed in that region at the high, 720 dpi resolution will become four times as large as the number of dots printed in that region at the normal, 360 dpi resolution. During the high resolution printing, therefore, the amount of ink placed on the sheet of paper will become four times as large as that of the ink to be placed on the sheet of paper at the normal resolution printing. Accordingly, a cockling phenomenon will possibly occur. That is, the sheet of paper will become wrinkled. Ink will drop along the sheet of paper.

In order to solve this problem, the printer can be provided with a control mechanism for limiting the total amount of ink to be ejected onto the sheet of paper. That is, an upper limit is determined onto a multilevel density of the input image which is to be converted into a bilevel density. Then, the thus level-limited multilevel density is converted into a binary value through an error diffusion binary conversion method, a dithering binary conversion method, or the like. Because the multilevel data is limited by the upper limit, it is possible to prevent all the dots from being printed.

It is assumed that the upper limit is set as 75% of the highest density value inputtable to the printer as multilevel data. It is also assumed that a color continuous tone image to be printed is comprised of three color component data: cyan data C, magenta data M, and yellow data Y.

When a certain image portion in the continuous tone image has density values of 100% for all the components, this image portion should be printed as black. If the above-described ink amount limiting control is achieved onto this image portion, density data for each color component will be decreased to 75% of the original value. That is, C=75%, M=75%, and Y=75%. The thus adjusted color component densities are then subjected to the binary conversion process such as the error diffusion binary conversion, the dither binary conversion, or the like. As a result, dots will be distributed only at 75% of all the dot positions in the subject image portion.

This image portion, however, should appear black. That is, dots of all the color components should be located one on another at each dot location, thereby presenting black color according to a subtractive color mixing method. When the dots are distributed only at 75% of all the dot locations, however, dots of all the color components will not be located one on another. There will be distributed: single color dots of cyan, magenta, and yellow; two color-mixed dots produced by two of the three color components; and three color-mixed dots properly produced by the three color components. The subject image portion will appear as different from black because those different types of dots will be visually perceived according to an additive color mixing method. Accordingly, the reproducibility of the image portion will be greatly deteriorated.

The binary conversion method can be modified as described below. That is, when data of all the three color components C, M, and Y for one pixel position is turned ON, the corresponding pixel is replaced with a single black dot K. For a black-representing pixel, therefore, only a single black dot will be located. It is unnecessary to provide the three color dots. It is possible to effectively prevent occurrence of the cockling phenomenon or the occurrence of ink dropping phenomenon.

Color components C, M, and Y may be subjected to the ink amount limiting control before they are subjected to the thus modified binary conversion process. In this case, however, color components C, M, and Y indicative of a black color region may possibly fail to be turned ON. Also in this case, the black-representing region will be reproduced by mixture of: single color dots of cyan, magenta, and yellow; and two color-mixed dots produced by two color component dots; and black dots. This image region will fail to represent accurate black color.

It is additionally noted that each of the single color dots of cyan, magenta, and yellow and the two color-mixed dots should have been converted into a single black dot K. Accordingly, the number of dots located in that black image region increases in comparison with the case where those dots are properly converted into black dots only. In other words, the ink amount limiting control makes it difficult to prevent occurrence of cockling phenomenon.

In order to solve this problem, it is conceivable to decrease the amount of the upper limit set in the ink amount limiting control. In this case, the coloring state of a resultant image will be further shifted from a desired state. The printing quality will be greatly deteriorated.

An object of the present invention is therefore to solve the above-described problems and to provide an improved color image binary conversion method which is capable of converting a continuous tone color image into a pseudo-halftone color image at a high resolution while not deteriorating the printing quality and while limiting the amount of ink to be ejected, thereby preventing occurrence of the undesirable cockling phenomenon.

In order to attain the above and other objects, the present invention provides a method for converting continuous tone color image data into pseudo-halftone color image data, the method comprising the steps of: successively judging whether or not each of a plurality of pixels, arranged in a continuous tone color image, is located at a predetermined printing-prohibited pixel position, while comparing, for each of a plurality of different color components, density data of at least one pixel other than that located at the printing-prohibited pixel position, with a threshold value; and compulsively converting the density value into the binary value of OFF when the subject pixel is judged to be located at the predetermined printing-prohibited pixel position and converting the density value into a binary value of either ON or OFF based on the compared result when the subject pixel is judged not to be located at the predetermined printing-prohibited pixel position.

According to another aspect, the present invention provides a program storage medium for storing data of a program indicative of a process for converting continuous tone color image data into pseudo-halftone color image data, the program comprising: a program of successively judging whether or not each of a plurality of pixels, arranged in a continuous tone color image, is located at a predetermined printing-prohibited pixel position, while comparing, for each of a plurality of different color components, density data of at least one pixel other than that located at the printing-prohibited pixel position, with a threshold value; and a program of compulsively converting the density value into the binary value of OFF when the subject pixel is judged to be located at the predetermined printing-prohibited pixel position and converting the density value into a binary value of either ON or OFF based on the compared result when the subject pixel is judged not to be located at the predetermined printing-prohibited pixel position.

According to still another aspect, the present invention provides a printer for converting continuous tone color image data into pseudo-halftone color image data and for printing the pseudo-halftone color image, the printer comprising: means for successively judging whether or not each of a plurality of pixels, arranged in a continuous tone color image, is located at a predetermined printing-prohibited pixel position, while comparing, for each of a plurality of different color components, density data of at least one pixel other than that located at the printing-prohibited pixel position, with a threshold value; means for compulsively converting the density value into the binary value of OFF when the subject pixel is judged to be located at the predetermined printing-prohibited pixel position and converting the density value into a binary value of either ON or OFF based on the compared result when the subject pixel is judged not to be located at the predetermined printing-prohibited pixel position; and means for printing a pseudo-halftone color image based on the binary value obtained for each pixel for each color component.

According to another aspect, the present invention provides a method for converting continuous tone color image data into pseudo-halftone color image data, the method comprising the steps of: successively comparing, for each of a plurality of different color components, density data of a plurality of pixels arranged on a continuous tone color image with a threshold value, while judging whether or not a location of the subject pixel is at a predetermined printing prohibited position; and converting the density data into a binary value of either ON or OFF based on the compared result, while compulsively converting the density data of some pixels, each of which is located at the predetermined printing prohibited position.

BRIEF DESCRIPTION OF THE DRAWINGS

The above and other objects, features and advantages of the invention will become more apparent from reading the following description of the preferred embodiment taken in connection with the accompanying drawings in which:

FIG. 4(a) illustrates a printing prohibiting matrix used in the first embodiment;

FIG. 4(b) illustrates a modification of the printing prohibiting matrix of FIG. 4(a);

FIG. 7(a) illustrates an original matrix, based on which a printing prohibiting matrix is produced;

FIG. 7(b) illustrates how to produce the printing prohibiting matrix according to the second embodiment;

FIG. 8(a) shows a set of three dither matrices to be used also as the printing prohibiting matrix according to a third embodiment;

FIG. 8(b) shows an original set of three dither matrices, based on which the set of three dither matrices of FIG. 8(a) is produced;

FIG. 16 illustrates an error distribution matrix Cmat() used in the process of FIG. 15.

DETAILED DESCRIPTION OF THE PREFERRED EMBODIMENTS

Figure 1:
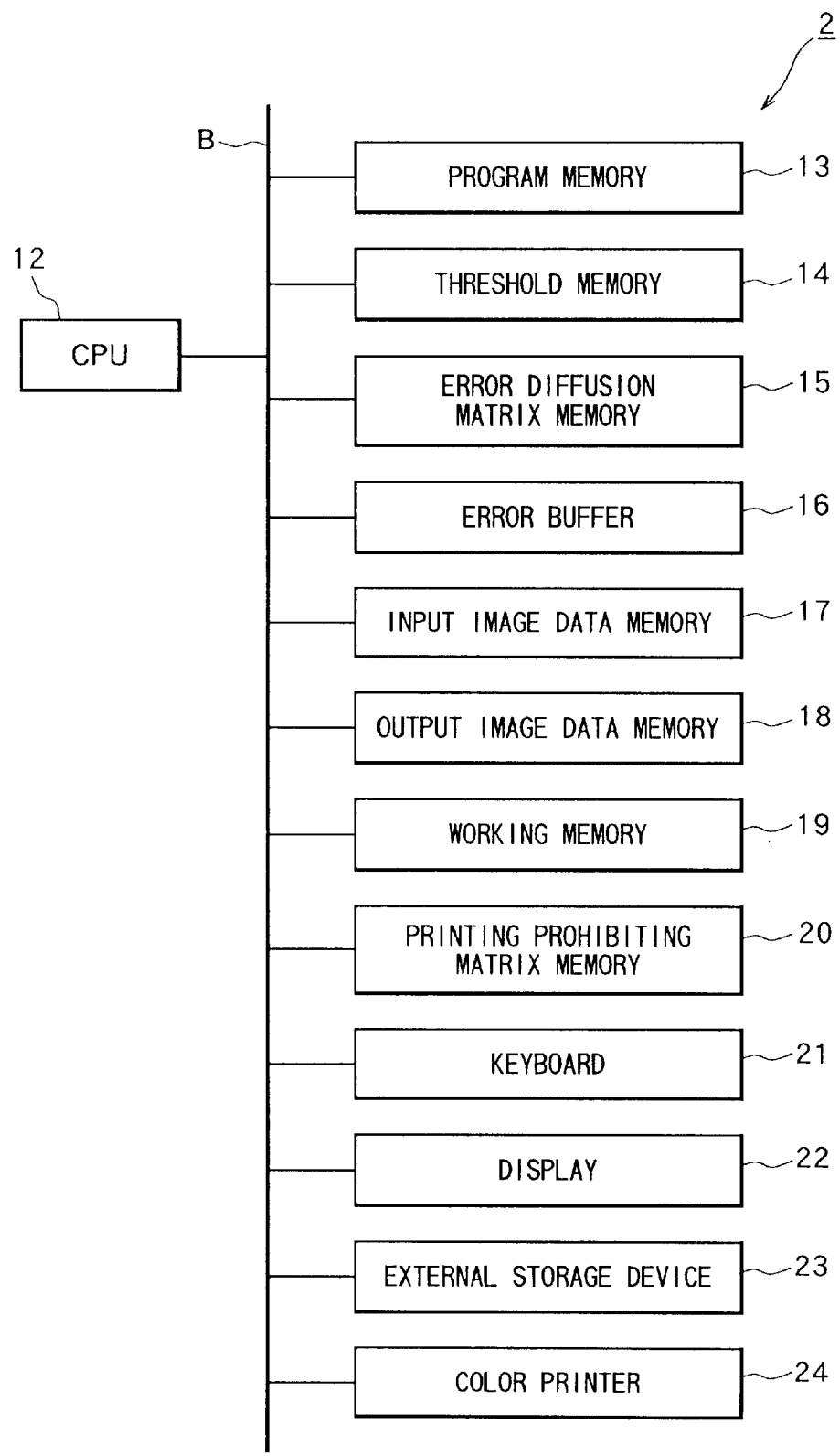
FIG. 1 is a block diagram of an image data conversion device of a first embodiment of the present invention.

A method for converting continuous tone color images into pseudo-halftone color images according to preferred embodiments of the present invention will be described below while referring to the accompanying drawings wherein like parts and components are designated by the same reference numerals.

A first embodiment will be described below with reference to FIGS. 1 through 4(a).

FIG. 1 is a block diagram of a continuous tone color image data conversion device 2 which performs the image conversion method of the present embodiment. More specifically, the device 2 is provided to convert input continuous tone color images with 256 tone levels 0–255 into output binary pseudo-halftone color images through an error diffusion binary image conversion method.

A main part of the image conversion device 2 is constructed from a computer. The computer includes: a CPU 12; a program memory 13 constructed from a ROM; a threshold storage portion 14 constructed from a RAM; an error distribution matrix storage memory 15 constructed from another RAM; an error buffer 16 also constructed from another RAM; an input image memory 17 also constructed from another RAM; an output image memory 18 constructed from still another RAM; a working memory 19 constructed from another RAM; and a printing prohibiting matrix memory 20 constructed from another RAM. The respective elements 12 through 20 are connected to one another via a bus line B to exchange control signals and data signals therebetween.

The image conversion device 2 is further provided with: input/output elements, such as a keyboard 21, a mouse device (not shown), and a display 22, which are required for the device 2 to perform a computing operation; an external data storage device 23 such as a hard disk drive and a floppy disk drive; and a color printer 24. Those elements 22 through 24 are also connected to the elements 12–19 via the bus B. It is noted that the key board 21 is for setting the printing mode of the color printer 24 in a high resolution mode for printing images at a normal resolution (360 dpi, for example) or a high resolution mode for printing images at a high resolution (720 dpi, for example).

Figure 2:
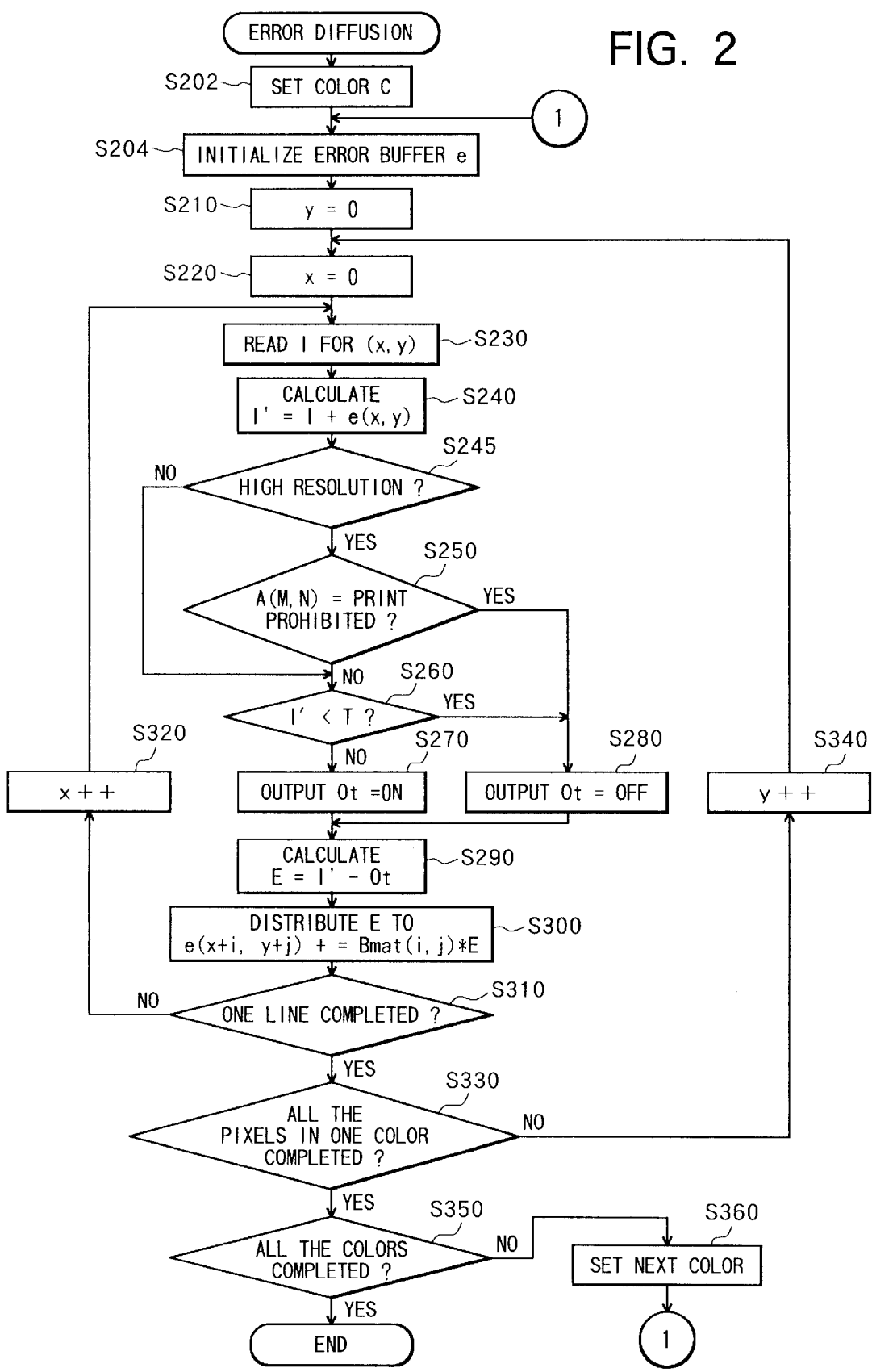
FIG. 2 is a flow chart of an error diffusion image conversion process of the first embodiment.

The program storage portion 13 previously stores therein: data of a basic program required for the device 2 to perform a computing operation; data of a program of an error diffusion image conversion process as shown in FIG. 2 for converting continuous tone color images into pseudo-halftone binary color images; and data of other various processing programs. Each program is executed by the CPU 12 when required. It is noted that data of those programs may be previously stored in a floppy disk, a magnetooptical disk, a CD-ROM or the like. When required, data of the programs is retrieved from these data storage media by the operation of the external data storage device 23 and is written into the working memory 19.

Figure 3:
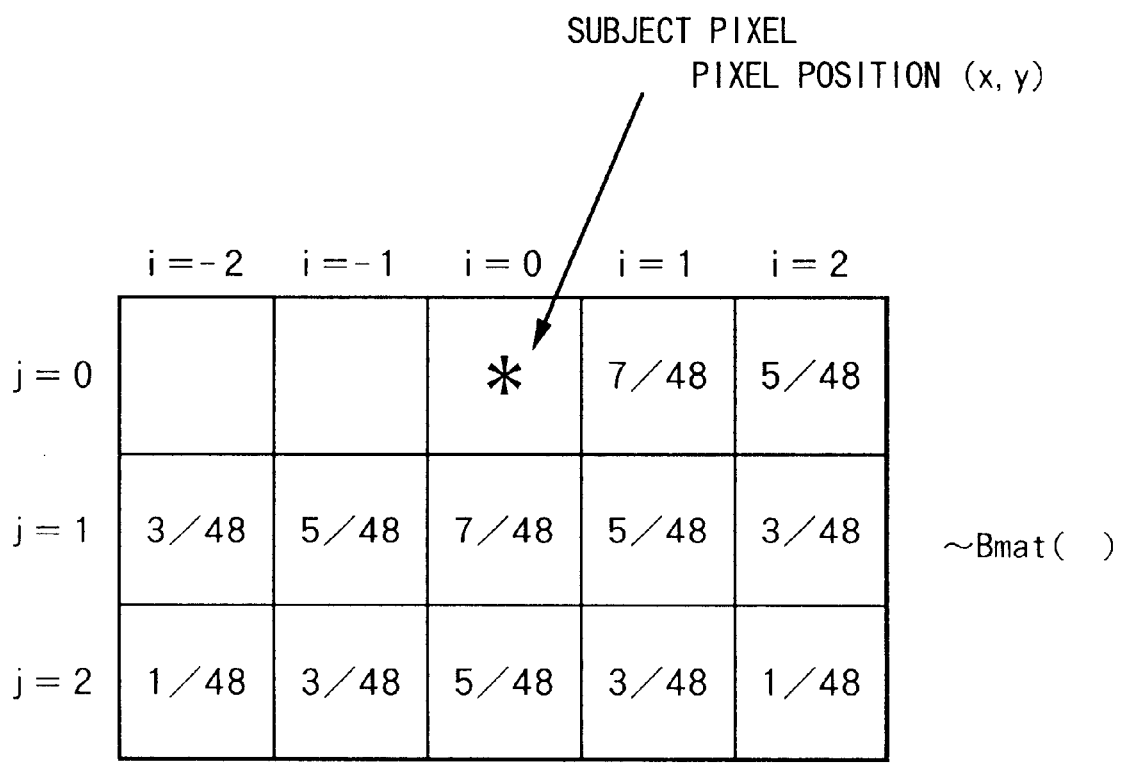
FIG. 3 illustrates an error distribution matrix used in the process of FIG. 2.

The threshold storage portion 14 previously stores therein a threshold T to be used during the error diffusion image conversion process. The error distribution matrix storage portion 15 previously stores therein an error diffusion matrix Bmat() shown in FIG. 3. As shown in FIG. 3, the error distribution matrix Bmat() indicates: neighboring pixels, to which a binarization error, occurred at a certain pixel (indicated by a mark *) during the error diffusion image conversion process of FIG. 2, is distributed; and distribution rates at which the error is distributed to the neighboring pixels.

The printing prohibiting memory 20 previously stores therein a printing prohibiting matrix A() shown in FIG. 4(a) which is being used during the image conversion process of FIG. 2.

The error buffer 16 is for storing errors distributed to each pixel from its neighboring pixels. The input image data storage portion 17 is for storing data of a continuous tone color image inputted from the external storage element 23 or the like to be converted into a pseudo-halftone color image. The storage portion 17 stores all the three color components C, M, and Y for all the picture elements (pixels) of the continuous tone image. Density of each pixel in each color component is in the range of zero (0) to 255. The output image data storage portion 18 is for storing the pseudo-halftone color image data which is obtained when the continuous tone color image data in the storage portion 17 is subjected to the error diffusion image conversion process of FIG. 2. When required, the thus obtained pseudo-halftone image data is displayed on the display 22 or is recorded by the color printer 24.

With the above-described structure, the device 2 of the present embodiment converts a continuous tone color image into a pseudo-halftone color image through the error diffusion image conversion process of FIG. 2.

During the error diffusion image conversion process, the three color components C, M, and Y are successively subjected to the image conversion process. That is, the density values C of all the pixels are first converted into binary values ON and OFF. Then, density values M of all the pixels are converted into binary values ON and OFF. Then, density values Y of all the pixels are converted into binary values ON and OFF.

The error diffusion image conversion process of the present embodiment will be described below with reference to FIG. 2. This process is executed by the CPU 12 to convert data of the continuous tone color image stored in the input image data memory 17 into data of a pseudo-halftone color image with the use of the threshold value T retrieved from the memory 14.

When the error diffusion image conversion process is started, a color component C (cyan) is first set to be processed in S202. Then, error buffers e(x, y) set in the error buffer 16 for the color component C are initialized to be cleared in S204.

Then, variables x and y are first initialized to zero (0) in S210 and S220. The variables x and y are for defining a subject pixel position (x, y) of the continuous tone color image whose density I is to be converted into a binary value. It is noted that a main scanning direction x is defined along each pixel line, and an auxiliary scanning direction y is defined perpendicular to the main scanning direction x.

Then, in S230, input density I(x,y) (where $0 \leq I \leq 255$) of a subject pixel (x, y) in the continuous tone color image is retrieved from the memory 17.

An error sum e(x, y) is retrieved from a corresponding memory location (x, y) in the buffer memory 16. The error sum e(x,y) is an accumulated amount of binary conversion errors distributed from already-processed neighboring pixels. The density value I(x, y) is then modified by the error sum e(x, y) in S240 through the following formula (1):

$$I'(x, y) = I(x, y) + e(x, y) \tag{1}$$

When a modified density I'(x, y) is thus calculated, the program proceeds to S245, wherein it is judged whether or not the present printing mode is set in the high resolution mode. When the present printing mode is set in the normal resolution mode different from the high resolution mode (no in S245), the program proceeds to S260. When the present printing mode is set in the high resolution mode (yes in S245), on the other hand, it is judged in S250 whether or not the subject pixel (x, y) is located at printing prohibited positions, based on the printing prohibiting matrix A() shown in FIG. 4(a). It is noted that in this judgment process of S245, the CPU 12 judges which of the normal resolution mode and the high resolution mode is set in the device 2. It is noted that the resolution mode setting has been achieved according to the user's manipulation of the key board 21, for example. The device 2 may ask the user in S245 whether or not the user desires to perform a printing operation with previously-determined printing prohibited positions.

As shown in FIG. 4(a), the printing prohibiting matrix A() is a matrix comprised of four rows and four columns. Printing prohibited positions are indicated by the marks "X", and printing allowed positions are indicated by marks "O". The total number of marks "O" is twelve (12), and the total number of marks "X" is four (4). It is therefore apparent that a rate of the printing allowed positions with regards to the entire image is set equal to 75% and that a rate of the printing prohibited positions with regards to the entire image is set equal to 25%. An element location (M, N) in the printing prohibiting matrix A() of FIG. 4(a), corresponding to the subject pixel position (x, y), is determined according to the following equations:

$$M = x \% 4$$

$$N = y \% 4$$

where the "%" is an operator for calculating a remainder obtained when a value appearing preceding the operator "%" is divided by another value appearing following the operator. For example, when the subject pixel position (x, y) is equal to (11, 26), M is equal to 3, and N is equal to 2. Accordingly, the location (M, N) is equal to (3, 2). As apparent from FIG. 4(a), a mark "○" is located as the element A(3, 2).

When the element A(M, N) at the location (M, N) (=(x%4, y%4)) is equal to "○" (no in S250), it is determined that the subject pixel (x, y) is located at a printing allowed position. The program therefore proceeds to S260 where the modified density I'(x, y) is compared with the threshold T which has been retrieved from the memory 14. The threshold value T is 128, for example. When I'(x, y)≧T (no in S260), the subject pixel is turned ON in S270. That is, the subject pixel density is converted into an output density Ot(x,y) of ON. When I'(x, y)<T (yes in S260), on the other hand, the subject pixel is turned OFF in S280. That is, the subject pixel density is converted into an output density Ot(x,y) of OFF. The thus obtained output density Ot(x,y) is stored in the output image data memory 18 as pseudo-halftone binary image data for the color component C. Thus, as the routine from S210–S330 is repeated, the density values Ot(x,y) of successive series of pixels are stored in the memory 18.

When the element A(M, N) at the location (M, N) is equal to "X" (yes in S250), on the other hand, the program directly proceeds to S280 without performing the comparing process of S260. This is because it is confirmed that the subject position (x, y) is a printing prohibited position as indicated by the mark "X". Accordingly, the subject pixel is compulsively turned OFF. That is, the output density Ot(x, y) is set to OFF.

After the process of S270 or S280, the program proceeds to S290, where a binary conversion error E(x, y) is calculated for the subject pixel (x, y) through the following formula (2):

$$E(x, y) = I'(x, y) - Ot(i, y) \qquad (2)$$

It is noted that when the output density Ot(x, y) is turned ON, the value Ot(x, y) is set equal to 255. When the output density Ot(x, y) is turned OFF, the value Ot(x, y) is set equal to zero (0).

The thus produced binary conversion error E(x, y) is then distributed in S300 to the error buffer 16 at a location (x+i, y+j) for each of neighboring twelve pixels not yet processed. The binary conversion error E(x, y) is distributed to the neighboring pixels in a weighted basis defined by the predetermined error diffusion matrix Bmat() through the following formula:

$$e(x+i, y+j) += Bmat(i,j) \times E(x, y)$$

wherein += is an operator for calculating a sum of a distributed fraction of the error E(x, y) and a value already stored in the error buffer (x+i, y+j) and for storing the calculated sum into the same error buffer (x+i, y+j). In the matrix Bmat() of FIG. 3, * indicates the subject pixel position (x, y), and each value in the matrix indicates a coefficient to be multiplied with the error E(x, y) before being distributed to a neighboring pixel (x+i, y+j) that is located relative to the subject pixel (x, y) as shown in the matrix. The thus distributed error fractional portion is accumulated in a corresponding memory location (x+i, y+j) in the error buffer 16 according to the above-described formula. For example, the next pixel (x+1, y) on the same pixel line with the subject pixel (x, y) receives a $7/48^{th}$ part of the error E(x, y). The $7/48^{th}$ part of the error E(x, y) is therefore accumulated in the corresponding memory location (x+1, y) of the error buffer 16. Thus, fractions of the error E(x, y) are distributed to the neighboring pixels (x+1, y), (x+2, y), (x−2, y+1), (x−1, y+1), (x, y+1), (x+1, y+1), (x+2, y+1), (x−2, y+2), (x−1, y+2), (x, y+2), (x+1, y+2), and (x+2, y+2).

Next, in S310, it is judged whether or not all the pixels in the present pixel line along the main scanning direction (x direction) have been processed. When any pixels remain unprocessed (no in S310), a pixel position is shifted to the next pixel position (x+1, y) in S320, and the process returns to S230. Then, the process from S230 is repeated. When all the pixels have been processed in the subject pixel line (yes in S310), on the other hand, it is judged in S330 whether or not all the pixels in the input image have been processed for the present color component. When any pixels remain unprocessed for the present color component (no in S330), the pixel position is shifted to the next pixel line in the auxiliary scanning direction y in S340. Then, the process returns to S220. Then, the process from S220 is repeated. When all the pixels have been processed for the present color component (yes in S330), it is further judged in S350 whether all the color components C, M, and Y have been processed. In this example, because only the present color component C has been processed (no in S350), the next color component M (magenta) is set in S360. Then, the binary conversion process for the color component M is performed in the same manner as described above for the color component C.

When the process for the color component M has been completed (no in S350), then, the color component Y (yellow) is set in S360 and processed in the same manner as described above. When all the pixels in the color component Y are completely processed, and therefore the binary data for the color component Y is completely stored in the memory 18 as binary image data for the component Y, it is determined in S350 that all the color components have been completely processed. Accordingly, this process ends. Thus, the inputted continuous tone color image is completely converted into a pseudo-halftone color image. At this time, the memory 18 is stored with an output density Ot for each pixel at all the color components C, M, and Y as representative of a pseudo-halftone color image obtained through the above-described binary conversion process. The color printer 24, such as a color ink jet printer, will print the pseudo-halftone color image through selectively ejecting ink of cyan, magenta, and yellow according to the output data Ot stored in the memory 18. That is, for each pixel, the color printer 24 will eject an ink droplet of each color when the corresponding color data Ot is ON and will not eject an ink droplet of each color when the corresponding color data Ot is OFF.

As described above, if printing is to be performed with a high resolution or if the user desires to perform the printing operation set with the printing prohibited positions, the printing prohibiting matrix A() is checked before each pixel density is converted into a binary value On or Off. When a subject pixel (x, y) is located at the printing prohibited position as indicated by the mark "X" in the matrix A(), the subject pixel is compulsively turned OFF. Only when the subject pixel is located at the printing allowed position as indicated by the mark "○", the density value is compared with the threshold T, based on which the density value is turned ON or OFF.

Accordingly, even for an image portion that will be printed completely black during the normal resolution mode, an area of 25% of that image portion is prohibited from being printed with dots during the high resolution mode. Accordingly, it is possible to suppress occurrence of cockling phenomenon and ink drop phenomenon even during the high resolution mode.

Even in this case, the original pixel density is not adjusted to be reduced. Accordingly, the resultant image, obtained through the high resolution mode, can represent the same coloring state as that obtained through the normal resolution mode.

Based on the pseudo-halftone image data obtained described above, black color data K of the ON value can be produced at pixel positions where all the cyan, magenta, and yellow color components are turned ON. Then, those color component data C, M, and Y are turned OFF. Because the original pixel density is not adjusted to be reduced, all the pixels in a black image portion can be reliably converted into black color data K of ON states. Those pixels will not be erroneously converted into separated color dots of cyan, magenta, or yellow. The black image portion will not be attached with a too much amount of separated color dots of cyan, magenta, and/or yellow inks. Cockling and ink drop defects can be efficiently suppressed.

As described above, for each of the color components C, M, and Y of the inputted continuous tone color image, each pixel density is compared with the threshold value, thereby converting the pixel into ON or OFF. A binary conversion error obtained during this conversion operation is affected to neighboring pixels. The printing prohibiting matrix A() is previously set to determine several pixels to be compulsively turned OFF. The error diffusion conversion process is attained with using the printing prohibiting matrix A(), thereby reducing the number of turned-On pixels and limiting the amount of ink to be ejected.

A second embodiment will be described below with reference to FIGS. 5 through 7(b).

Figure 5:
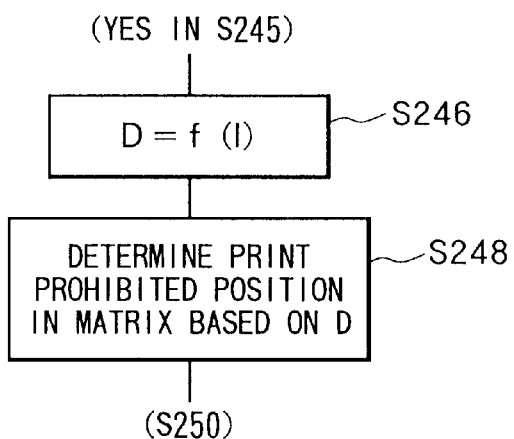
FIG. 5 is a flowchart of a part of the error diffusion conversion process in a second embodiment.

The present embodiment is the same as the first embodiment except that a printing prohibiting process of FIG. 5 is performed between the process of S245 and the process of S250 in FIG. 2.

Figure 6:
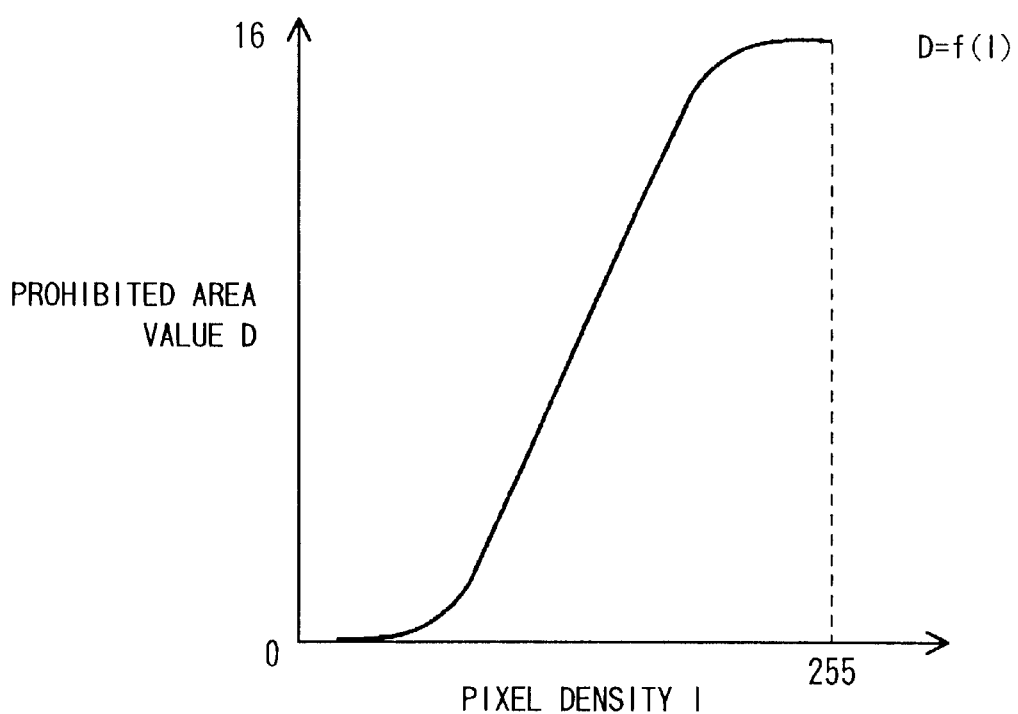
FIG. 6 is a graph showing a relationship between a pixel density I and a prohibiting area value D.

That is, when the present printing mode is judged to be the high resolution mode (yes in S245), a prohibited area value D is calculated in S246 based on the subject pixel density I(x, y) while referring to a relationship f(I) of FIG. 6 which is defined between the pixel density I and the prohibited area value D. The prohibited area value D is in a range of 0 to 16. As apparent from FIG. 6, as the pixel density I increases, the prohibited area value D will increase. For example, when the subject pixel density I is equal to about 128, the prohibited area value D is calculated as equal to 8. When the subject pixel density I is equal to about 255, the prohibited area value D is calculated as equal to 16.

Next, in S248, printing prohibited positions are set in a density-dependent printing prohibiting matrix A'() of FIG. 7(a). This density-dependent printing prohibiting matrix A'() is a matrix comprised of eight rows by eight columns. The matrix A'() therefore has 64 elements, in total. Sixteen elements out of the 64 elements are set with values from one (1) to sixteen (16), and are defined as candidates to be set as printing prohibited positions. More specifically, elements in the sixteen candidate elements, that have the element values smaller than the prohibited area value D calculated in S246, are set as printing prohibited positions.

For example, when the prohibited area value D is calculated as equal to eight (D=8) in S246, the candidate elements, whose values are equal to or lower than the prohibited area value D, are set as printing prohibited positions as indicated by the marks "X" in FIG. 7(b). All other remaining elements are set as printing allowed positions.

Then, the program proceeds to S250 in FIG. 2. In S250, it is judged whether or not the subject pixel (x, y) is at any of the printing prohibited positions indicated by the marks "X" in the density-dependent matrix A'() of FIG. 7(b).

It is noted that because the density-dependent printing prohibiting matrix A'() is the 8×8 matrix, the element position (M, N) in the matrix A'() as corresponds to the subject pixel (x, y) is determined by the following formulas:

$$M = x \bmod 8$$

$$N = y \bmod 8$$

For example, when (x, y)=(12, 20), (M, N) is calculated as (4, 4). Because A'(4,4) is equal to "X" in FIG. 7(b), it is determined that the pixel (12, 20) is located at a printing prohibited position.

It is noted that when the subject pixel (x, y) has the density value I of 255, the prohibited area value D is calculated as sixteen (16) in S246 based on the relationship f(I) of FIG. 6. That is, D=16. Thus, all the sixteen element candidates "1"–"16" in FIG. 7(a) are set as printing prohibited positions "X" in S248. As a result, a rate of the printing prohibited positions in the entire matrix A'() is set as 25%, and a rate of printing allowed positions in the entire matrix A'() is set as 75%. Thus, a distribution rate the same as that in the first embodiment can be obtained. Accordingly, it is possible to prevent all the pixels having densities I of 255 from being turned ON. Some of the pixels having density levels of 255 will be compulsively turned OFF. The same advantages as obtained in the first embodiment can be obtained.

Additionally, according to the present embodiment, as shown in FIG. 6, the prohibiting area value D decreases as the density value I of the subject pixel (x, y) decreases. Accordingly, as the density value I for the subject pixel decreases, the rate of the number of the printing prohibited positions with respect to the entire element positions in the matrix A'() will decrease. When the density value I reaches zero (0), the number of the printing prohibited positions will become zero (0). Thus, a small number of printing prohibited positions will be set for an image region that has a low density I because such an image portion will not suffer from any cockling or ink drop problems. It is therefore possible to perform high quality printing operation onto the low density region.

It is noted that in S246, the prohibited area value D is calculated based on the original density I. However, the prohibited area value D can be calculated based on the modulated density I' which is calculated in S240. In this case, the printing prohibited area value D is calculated while referring to another relationship f'(I') which is defined between the modified density I' and the prohibited area value D and which is not shown in the drawing. The value I' may range from a negative value toward a positive value higher than 255, while the value I ranges from zero (0) to 255. Accordingly, the relationship f'(I') should be determined in correspondence with that range of the value I'.

An average density Ia may be calculated based on densities of pixels that are located in the neighborhood of the subject pixel (x, y) and that are different from the neighboring pixels, to which the binary conversion error is to be distributed from the subject pixel. The prohibited area value D can be determined based on this average density Ia while referring to the relationship f(I) of FIG. 6. Thus considering the densities of the neighboring pixels, it is possible to perform the binary conversion process of FIG. 2 while being accurately affected by the density state of a region in which the subject pixel is located.

A third embodiment will be described below with reference to FIGS. 8(*a*) and 8(*b*) and FIG. 9.

This embodiment does not employ the error diffusion method, but employs the dither method. That is, the present embodiment uses a set of dither matrices DmC(), DmM(), and DmY(), an example of which is shown in FIG. 8(*b*).

The set of dither matrices is comprised of three dither matrices DmC(), DmM(), and DmY() for cyan, magenta, and yellow color components. Each of the matrices DmC(), DmM(), and DmY() is comprised of four rows by four columns. This set of dither matrices DmC(), DmM(), and DmY() is for binary converting a continuous tone color image, in which a density for each of cyan, magenta, and yellow color components is in a range of zero (0) to fifteen (15), into a pseudo-halftone binary color image. Threshold values in the range of 1 to 16 are distributed in each of the matrices DmC(), DmM(), and DmY(). It is noted that the threshold distribution states in the matrices DmC(), DmM(), and DmY() are different from one another.

According to the present embodiment, another set of dither matrices DmC'(), DmM'(), and DmY'() shown in FIG. 8(*a*) is prepared based on the matrices DmC(), DmM(), and DmY(). As apparent from FIG. 8(*a*), four element positions in the sixteen element positions in each of the matrices DmC'(), DmM'(), and DmY'() are determined as printing prohibited positions as indicated by the marks "X". The positions of the thus determined printing prohibited positions are equal to one another in all the matrices. A zero (0) value, for example, which is discriminatable from other threshold values 1 through 16, may be set in each printing prohibited position.

According to the present embodiment, the original dither matrices DmC(), DmM(), and DmY() of FIG. 8(*b*) are used during the normal resolution mode. The dither matrices DmC'(), DmM'(), and DmY'() of FIG. 8(*b*) are used during the high resolution mode. During the high resolution mode, therefore, a quarter of the entire pixels will be prohibited from being printed with dots. Accordingly, it is possible to prevent occurrence of the cockling phenomenon and the ink dropping operation.

Figure 9:
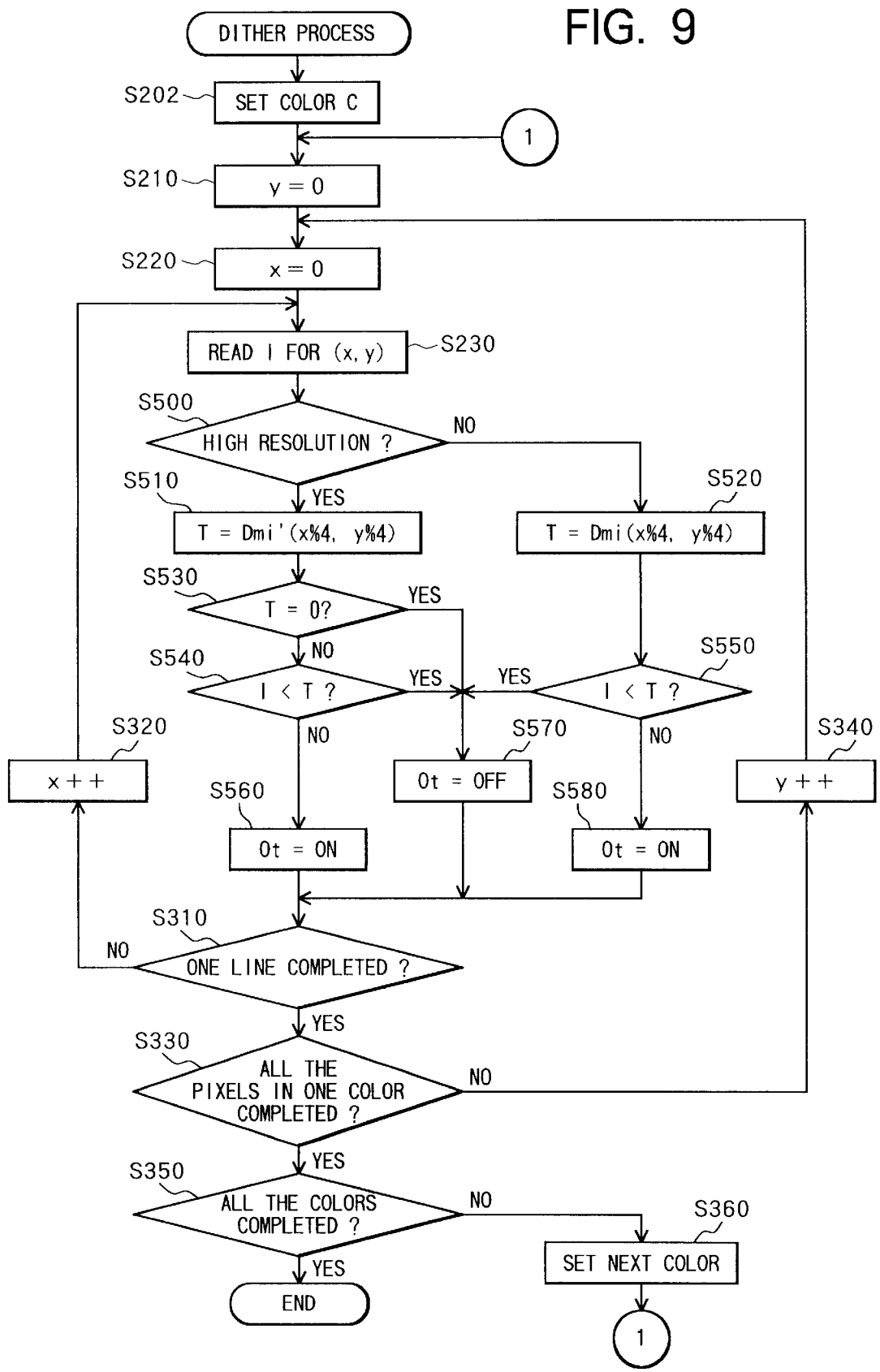
FIG. 9 is a flowchart of a dither matrix-employed image conversion process according to the third embodiment.

According to the present embodiment, the binary conversion process is performed as shown in FIG. 9. This binary conversion process is the same as that of FIG. 2 except that the processes S204 and S240 in FIG. 2 are omitted and that the processes S245 to S300 in FIG. 2 are replaced with processes from S500 to S580.

That is, when the present printing mode is the normal resolution mode (no in S500), a threshold value T is retrieved in S520 from the original dither matrix Dmi (where i is equal to C, M, or Y as set in S202 or S360) for the subject pixel location (x, y). That is, a threshold value T is read out from the threshold matrix Dmi() of FIG. 8(*b*) at an element position (x%4, y%4) which corresponds to the subject pixel position (x, y). This reading operation is performed through calculating the following formula:

$$T = Dmi(x\%4, y\%4)$$

For example, during the processes for the cyan component, when the subject pixel position is (0, 0), a threshold value T of 3 is read out from an element position (0, 0) of the matrix DmC() because x % 4=0 and y % 4=0. Similarly, when the subject pixel position is (11, 100), a threshold value T of 14 is read out from an element position (3, 0) of the matrix DmC() because x % 4=3 and y % 4=0.

Then, in S550, the subject pixel density I(x, y), which has been retrieved in S230, is compared with the threshold T which has been obtained in S520. When I(x, y)≧T (no in S550), the subject pixel is turned ON in S580. When I(x, y)<T (yes in S550), on the other hand, the subject pixel is turned OFF in S570.

When the present printing mode is the high resolution mode (yes in S500), on the other hand, a threshold value T is retrieved in S510 from the adjusted dither matrix Dmi' (where i is equal to C, M, or Y as set in S202 or S360) for the subject pixel location (x, y). That is, a threshold value T is read out from the threshold matrix Dmi'() of FIG. 8(*a*) at an element position (x%4, y%4) which corresponds to the subject pixel position (x, y). This reading operation is performed through calculating the following formula:

$$T = Dmi'(x\%4, y\%4)$$

For example, during the processes for the cyan component, when the subject pixel position is (0, 0), a threshold value T of 3 is read out from an element position (0, 0) of the matrix DmC'(). When the subject pixel position is (11, 100), on the other hand, a threshold value T of 0 ("X") is read out from an element position (3, 0) of the threshold value matrix DmC'().

Then, in S530, it is judged whether or not the retrieved threshold value T is equal to zero (0). When the threshold value T is equal to zero (0) (yes in S530), it is determined that the subject pixel is located at a printing prohibited position. Accordingly, the program proceeds to S570 where the subject pixel is compulsively turned OFF. When the threshold value T is not equal to zero (0) (no in S530), on the other hand, it is determined that the subject pixel is at a printing allowed position. Accordingly, in S540, the subject pixel density I(x, y) is compared with the threshold T which has been obtained in S510. When I(x, y)≧T (no in S540), the subject pixel is turned ON in S560. When I(x, y)<T (yes in S540), on the other hand, the subject pixel is turned OFF in S570. The binary value obtained in S560, S570, or S580 is stored in the memory 18.

Also in the present embodiment using the dither matrices, the prohibited area value D may be calculated based on the subject pixel density I or the average density Ia while referring to the relationship of FIG. 6, thereby adjusting the number of the printing prohibited positions "X" in each of the matrices DmC'(), DmM'(), and DmY'(). The same advantages as obtained in the second embodiment can be obtained.

The printing prohibited matrix A() of FIG. 4(*a*) employed in the first embodiment is not related to the amount of the threshold T. However, the first embodiment can be modified as described below.

The printing prohibited matrix A() can be modified into a threshold matrix T() as shown in FIG. 4(*b*). This matrix T() is constructed from: threshold values T1 through T12 which will be used during an error diffusion conversion process shown in FIG. 10; and another threshold value, zero (0), for example, which is discriminated from the threshold values T1 through T12 and which is indicative of a printing prohibited position. It is noted that all the threshold values T1 through T12 may be set different from one another. However, some of them may be set equal to one another. The threshold matrix T() can be determined differently for the respective color components C, M, and Y.

It is noted that the threshold matrix T() shown in FIG. 4(b) is used in the high resolution mode, and another threshold matrix T'(), not shown, is used in the normal resolution mode. For example, the threshold matrix T'() can be produced through setting other threshold values T13 through T16 onto "0"-element positions in the threshold matrix T() of FIG. 4(b). The threshold matrix T'() is therefore comprised of a 4×4 matrix with threshold values T1–T16.

Figure 10:
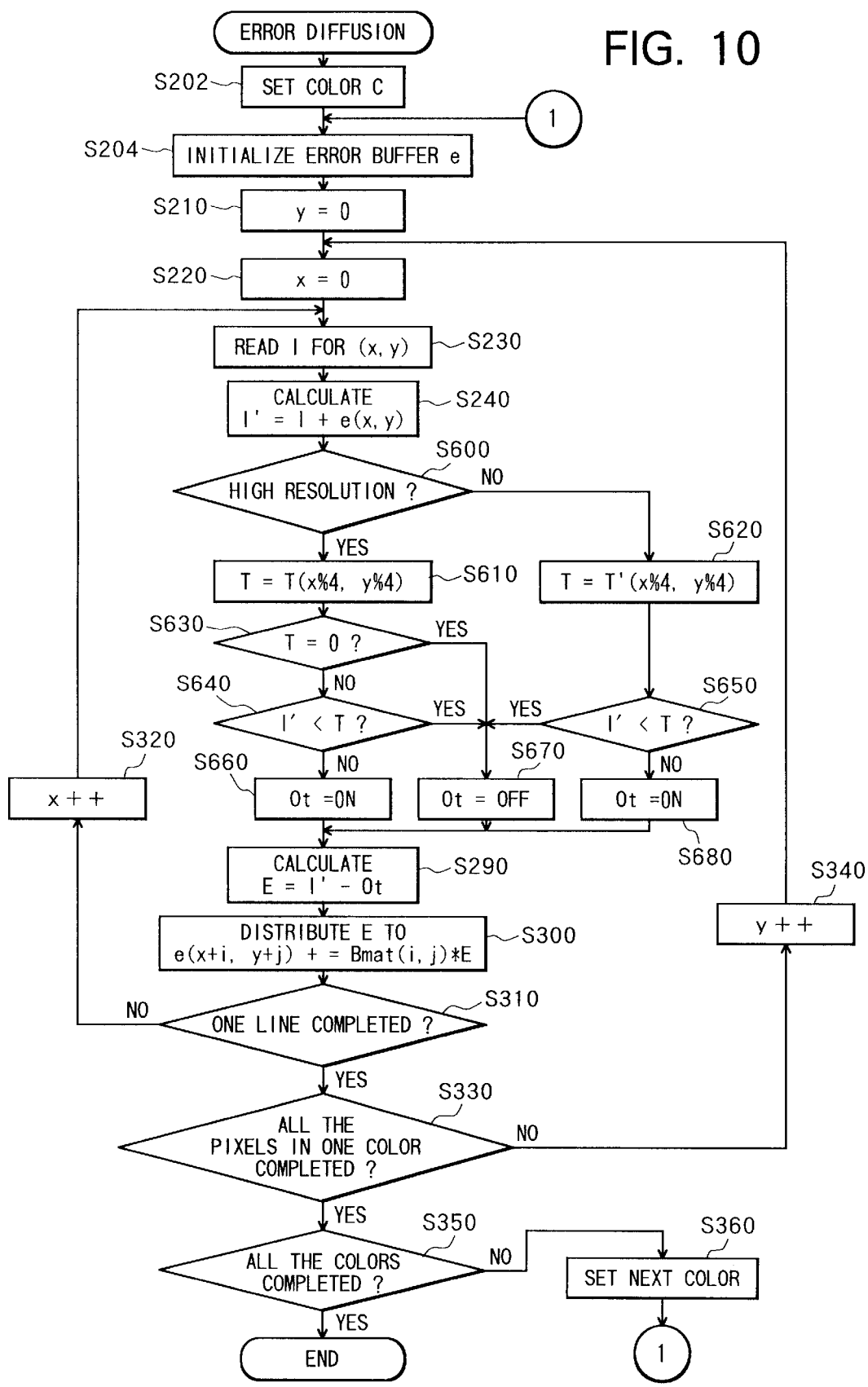
FIG. 10 is a flowchart of a dither matrix-employed error diffusion image conversion process according to a modification.

When using the above-described threshold matrices T() and T'(), the error diffusion binary conversion process of FIG. 2 is modified as shown in FIG. 10. That is, the processes S245 to S280 in FIG. 2 are replaced with processes from S600 to S680.

That is, when the present printing mode is the normal resolution mode (no in S600), a threshold value T is retrieved in S620 from the threshold matrix T'() for the subject pixel location (x, y). That is, a threshold value T is read out from the threshold matrix T'() at an element position (x%4, y%4) which corresponds to the subject pixel position (x, y). This reading operation is performed through calculating the following formula:

$$T=T'(x\%4, y\%4)$$

The read out threshold T is therefore one of the threshold values T1 through T16. Then, in S650, the modified density I'(x, y), which has been calculated in S240, is compared with the threshold T which has been obtained in S620. When I'(x, y)≧T (no in S650), the subject pixel is turned ON in S680. When I'(x, y)<T (yes in S650), on the other hand, the subject pixel is turned OFF in S670.

When the present printing mode is the high resolution mode (yes in S600), on the other hand, a threshold value T is retrieved in S610 from the threshold matrix T() shown in FIG. 4(b) for the subject pixel location (x, y). That is, a threshold value T is read out from the threshold matrix T() at an element position (x%4, y%4) which corresponds to the subject pixel position (x, y). This reading operation is performed through calculating the following formula:

$$T=T(x\%4, y\%4)$$

The read out threshold T is therefore one of the threshold values T1 through T12 and zero (0).

Then, in S630, it is judged whether or not the retrieved threshold value T is equal to zero (0). When the threshold value T is zero (yes in S630), it is determined that the subject pixel is at a printing prohibited position. Accordingly, the program proceeds to S670 where the subject pixel is compulsively turned OFF. When the threshold value T is not equal to zero (0) (no in S630), it is determined that the subject pixel is at a printing allowed position. Accordingly, in S640, the modified density I'(x, y), which has been calculated in S240, is compared with the threshold T which has been obtained in S610. When I'(x, y)≧T (no in S640), the subject pixel is turned ON in S660. When I'(x, y)<T (yes in S640), on the other hand, the subject pixel is turned OFF in S670. Then, the program proceeds to S290, where the binary conversion error is calculated, and is distributed to unprocessed neighboring pixels in S300.

In the first embodiment, it is judged in S250 whether or not the subject pixel is at a printing prohibited position, while referring to the matrix A() of FIG. 4(a). However, according to the above-described modification, the judgment is attained based on a threshold value T retrieved from the matrix T() or T'() at a location corresponding to the subject pixel position.

In the above description, the printing prohibited positions are distributed regularly in each of the printing prohibiting matrix A(), the dither matrices DmC', DmM', and DmY', and the threshold matrix T(). The printing prohibited position candidates are distributed regularly in the printing prohibiting matrix A'(). However, the printing prohibited positions (and the printing prohibited position candidates) may be distributed in a random manner.

The printing prohibited positions (and the printing prohibited position candidates) may be arranged with using a blue noise mask production method, for example.

The blue noise mask production method is generally used for producing a dither matrix for converting a continuous tone image into a pseudo-halftone image. According to the blue noise mask production method, a bilevel mask (binary pattern) is first prepared. The bilevel mask is formed with a plurality of elements which are arranged two-dimensionally. Either one of two (first and second) different values are assigned to each element. A ratio between the number of the first value-assigned elements relative to the number of the second value-assigned elements is predetermined. Distribution of the first and second values is evaluated, and the first and second values are distributed so that any clusters are not formed by any of the first and second values. Based on the thus produced one bilevel matrix, a plurality of bilevel matrices can be produced. A multilevel threshold matrix can be produced based on the plurality of bilevel matrices. A representative example of the blue noise mask production method is proposed in "The Void and Cluster method for dither array generation" by Robert Ulichney SPIE Vol. 1913. It is noted, however, that other various types of blue noise mask production methods can be employed.

Next will be described one example of a process for producing the printing prohibiting matrix A() of FIG. 4(a) through the blue noise mask production method.

First, a bilevel threshold matrix Mat2() is produced through locating two kinds of values "0" and "1" throughout the matrix so that the concentration or density of neighboring "0" data elements located around each "0" data element will substantially be uniform for all the "0" data elements and so that the concentration or density of neighboring "1" data elements located around each "1" data element will substantially be uniform for all the "1" data elements. More specifically, the matrix is first prepared so that the two kinds of (first and second) threshold values are distributed in a random order throughout all the element positions. Then, for each of the elements having the first threshold value, the concentration or density of neighboring elements having the same threshold value is calculated. Then, a single first value-assigned element that has the highest concentration or density of the neighboring first value-assigned elements is determined. This element is termed a first value highest density position. Similarly, for each of the elements having the second threshold value, the concentration or density of neighboring elements having the same threshold value is calculated. A single second value-assigned element that has the highest concentration or density of the neighboring second value-assigned elements is determined. This element is termed a second value highest density position. Then, the first threshold value at the first value highest density position is replaced with the second threshold value at the second value highest density position. This process is repeated until the matrix has uniform distribution of the first and second threshold values. Thus, a bilevel matrix with uniformly distributed two values is obtained. The two values are replaced with the two marks "X" and "O", there by producing the printing prohibiting matrix A().

The matrix production process will be described below in greater detail with reference to FIGS. 11 and 12. This process can also be performed in the image conversion device 2.

When the process starts, a memory region of a two-dimensional M by N dot size is prepared in the working memory 19 for storing therein the M column by N row matrix A() desired to be produced. Because the matrix A() has four rows by four columns as shown in FIG. 4(a), M and N are equal to four, and therefore the four by four dot size memory region is prepared.

Then, in S1100, element values J(x, y) of either zero (0) or one (1) are randomly located in all the element positions (x, y) where x and y are integers and $0 \leq x \leq M-1$ and $0 \leq y \leq N-1$. This operation is performed to successively generate random numbers and to assign the values of "0" and "1" in correspondence with the generated random numbers. It is noted that the element values J(x, y) of "0" and "1" are arranged so that the rate of the number of "1"-assigned elements will become 25 with respect to the total number "M×N" of the elements.

Then, in S1110, an expected density value D(x, y) is calculated for each element position (x, y) where an element value J(x, y) of zero (0) or one (1) is located. The expected density value D(x, y) is calculated based on a weighting function $f(\Delta x, \Delta y)$ and element values $J(x-\Delta x, y-\Delta y)$ for other elements $(x-\Delta x, y-\Delta y)$ that are located in the neighborhood of the subject element (x, y). That is, the expected density value D(x, y) is calculated through the following formula:

$$D(x, y) = \sum_{\Delta x=-i}^{i} \sum_{\Delta y=-j}^{j} \{f(\Delta x, \Delta y) \times ABS[J(x+\Delta x, y+\Delta y) - \text{(majority value)}]\}$$

where $-i < \Delta x < i$ and $-j < \Delta y < j$, $0 < i < M$, and $0 < j < N$. ABS[] is a function for calculating an absolute value of a value appearing inside the symbol []. The "majority value" is defined as a value of "0" or "1" set in S1100 for more than half of all the elements of the M×N matrix. A "minority value" is defined as a value of zero (0) or one (1) set for less than half of all the elements. In this example, because more than half of the elements in the M×N matrix are set to "0", the minority value is one (1) and the majority value is zero (0). Elements having the majority values are referred to as majority elements, and elements having the minority values are referred to as minority elements. The weighting function $f(\Delta x, \Delta y)$ is for calculating a weighting value that decreases away from a subject element position (x, y). Various functions can be used as the weighting function $f(\Delta x, \Delta y)$. A representative example of the weighting function $f(\Delta x, \Delta y)$ is given by the following formula:

$$f(\Delta x, \Delta y) = \exp(-d^2/2S^2)$$

where $d^2 = \Delta x^2 + \Delta y^2$. S is an adjustment factor such as 1.5.

It is noted that D(x,y) for each element (x,y) indicates concentration or density of elements that are located around the subject element (x,y) and that have the same value as that of the subject element (x,y). For example, D(x,y) becomes minimum at a certain element position (x,y) around which majority elements are concentrated at a maximum degree. D(x,y) becomes maximum at another certain element position (x,y) around which minority elements are concentrated at a maximum degree. If f(x,y) is a fixed value, D(x,y) will simply indicate the number of elements that are located around the subject pixel (x,y) in a predetermined range and that have the same value as that of the subject element (x,y). If f(x,y) is a value changing depending on the values of x and y, on the other hand, D(x,y) will not simply indicate the number of the same-valued elements around the subject element (x,y).

Figure 12:
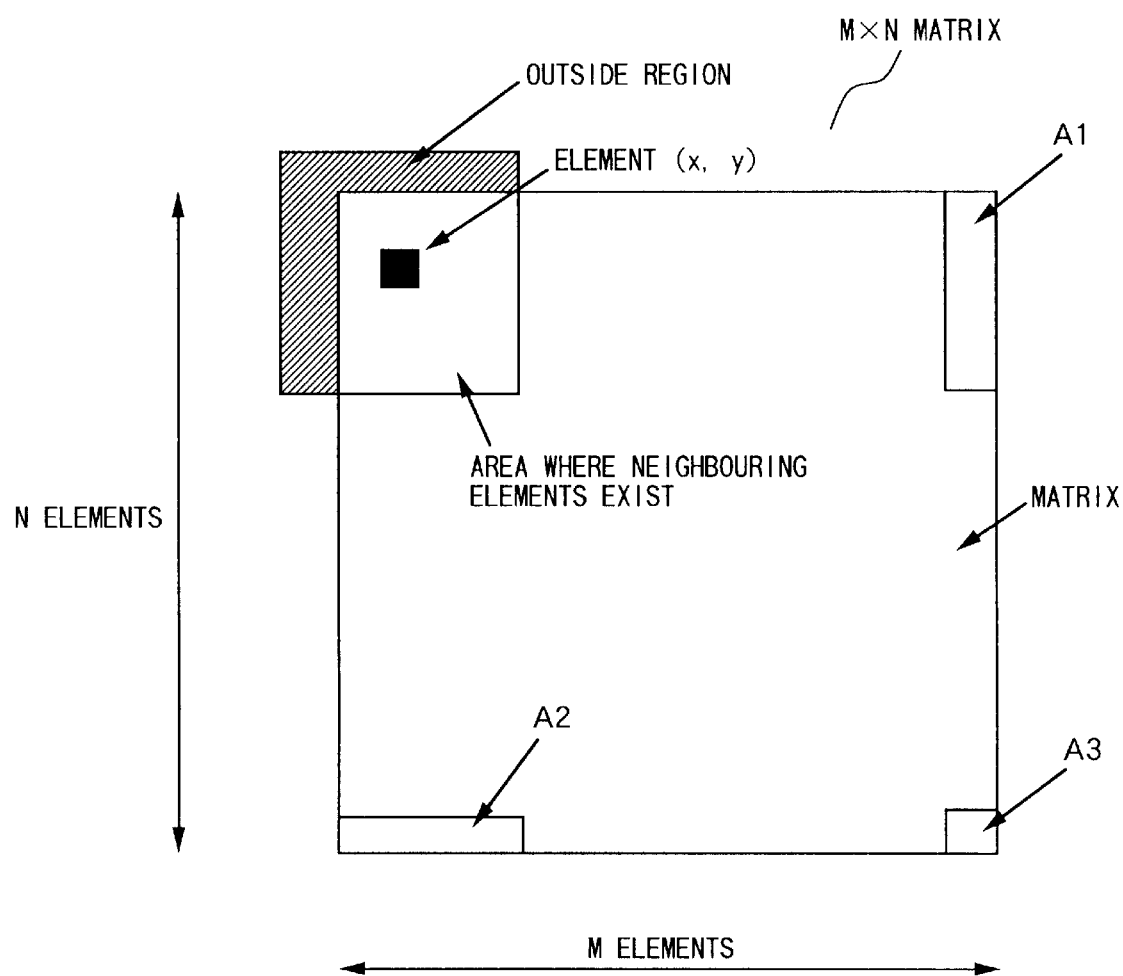
FIG. 12 illustrates an area in which neighboring elements are defined for calculating an expected density for a subject element in the process of FIG. 11.

It is further noted that when the subject element (x, y) is near to boundary edges of the M by N matrix, it is assumed that the M by N matrix will be replicated over a two-dimensional space to tile the entire space as shown in FIG. 12. For example, when calculating the expected density value D(x, y) for the subject element (x, y) shown in FIG. 12, those elements $(x-\Delta x, y-\Delta y)$ defined in the neighborhood of the subject element (x, y) are located not only in the inside of the M by N matrix but also in the outside area of the matrix as indicated by slanted line. In this case, element values $J(x-\Delta x, y-\Delta y)$ for those neighboring elements are set as equal to element values J of elements as located in corresponding three areas A1, A2, and A3 shown in the drawing.

After the expected density values D(x,y) are calculated for all the elements, the program proceeds to S1120. In S1120, an element (xmax, ymax) having the highest expected density D(xmax, ymax) is determined among all the elements having the element values J(x, y) of "1". This element will be referred to as a "highest expected density element" hereinafter. Then, an element (xmin, ymin) having a lowest expected density D(xmin, ymin) is determined among all the elements having the element values J(x, y) of "0". This element will be referred to as a "lowest expected density element" hereinafter.

Then, in S1130, the highest expected density element (xmax, ymax) and the lowest expected density element (xmin, ymin) are caused to switch their element values. That is, the element value "1" at the highest expected density element (xmax, ymax) is changed into "0". The element value "0" at the lowest expected density element (xmin, ymin) is changed into "1". That is, J(xmax, ymax)=0, and J(xmin, ymin)=1.

Then, in S1140, a predetermined evaluation operation is achieved to judge whether or not the values of "0" and "1" are uniformly distributed in the M by N matrix. This evaluation can be performed through showing the resultant M by N matrix on the display 22 or the color printer 24 to let a user visually observe the M by N matrix. This evaluation is therefore performed subjectively by the user.

When the user confirms in S1140 that the values of "0" and "1" are not yet uniformly distributed in the M by N matrix (no in S1140), the user manipulates the keyboard 21 to input this instruction. As a result, the processes of S1110 through S1130 are performed again before the judgment of S1140 is performed next. When the user confirms that the values of "0" and "1" become uniformly distributed in the M by N matrix (yes in S1140), the user manipulates the keyboard 21 to input this instruction. The matrix, thus finally obtained to have the uniformly distributed values "0" and "1", is set as a bilevel threshold matrix Mat2().

It is noted that the evaluation process of S1140 can be performed objectively as described below.

The process of S1140 is designed to perform the process the same as that of S1110 to calculate expected density values D(x, y) for all the elements (x, y) in the M by N matrix which have already been subjected to the replacement operation of S1130. Also during this step, a highest value is calculated among expected density values D(x, y) calculated for all the minority elements. This highest value is set as a highest expected density value "Dmax". Then, a lowest value is calculated among expected density values D(x, y) calculated for all the majority elements. The lowest value is set as a lowest expected density value "Dmin".

Then, an evaluation value "Eva" is calculated as a difference between the values "Dmax" and "Dmin". That is, Eva=Dmax−Dmin. It is noted that as the routine of S1110–S1140 is repeated, the evaluation value Eva gradually decreases in a direction toward zero, but finally converges to reach a certain value higher than zero.

Accordingly, in S1140, it is judged whether or not the evaluation value "Eva" has been sufficiently converged to the certain value. When it is judged that the evaluation value Eva obtained at the present routine is smaller than that obtained at the latest routine, it is determined that the evaluation value "Eva" is still being decreased as the routine of S1110–S1140 is repeated. It is therefore determined that the evaluation value "Eva" has not yet been fully converged to the certain value. It is therefore determined that the values of "0" and "1" are not yet uniformly distributed. Because the judgment in S1140 becomes negative, the processes of S1110 through S1130 are performed again before the judgment of S1140 is performed next. It is noted that because the process the same as that of S1110 is performed in the judgment process of S1140, if the negative judgment is attained in S1140, the program skips S1110 and directly proceeds to S1120. Only the processes of S1120 and S1130 are repeated.

When it is judged that the evaluation value Eva has been sufficiently converged to the certain value, on the other hand, it is confirmed that the values of "0" and "1" are uniformly distributed in the M by N matrix. For example, when the evaluation value "Eva" obtained at the present routine is equal to or larger than that obtained at the latest routine, it is determined that the evaluation value "Eva" has been fully converged to the certain value.

When it is thus confirmed that the values of zero (0) and one (1) are uniformly distributed in the M by N matrix (yes in S1140), this matrix is set as the bilevel threshold matrix Mat2() and stored in the memory 20 in S1150. It can therefore be said that the bilevel threshold matrix Mat2() is obtained to have uniformly-distributed two values of "0" and "1". Also in S1150, the printing prohibiting matrix A() of FIG. 4(a) is produced. That is, the "1"-assigned elements in the matrix Mat2() are reset with the marks "X", and the "0"-assigned elements are reset with the marks "○", as a result of which the printing prohibiting matrix A() shown in FIG. 4(a) is produced. The matrix A() is then stored also in the storage portion 20, and the matrix production process ends.

It is noted that the matrix T() shown in FIG. 4(b) can be produced in the same manner as described above. That is, after the bilevel matrix Mat2() is produced, the "1"-assigned elements are reset with a threshold value "0", and the "0"-assigned elements are reset with another threshold value "128", for example, in S1150. As a result, the matrix T() as shown in FIG. 4(b) is produced. In this case, all the threshold values T1 through T12 are set equal to the threshold value "128".

Next will be described a method of producing each of the dither matrices DmC', DmM', and DmY' of FIG. 8(a) and the threshold matrix T() of FIG. 4(b) with different threshold values T1 through T12.

Figure 11:
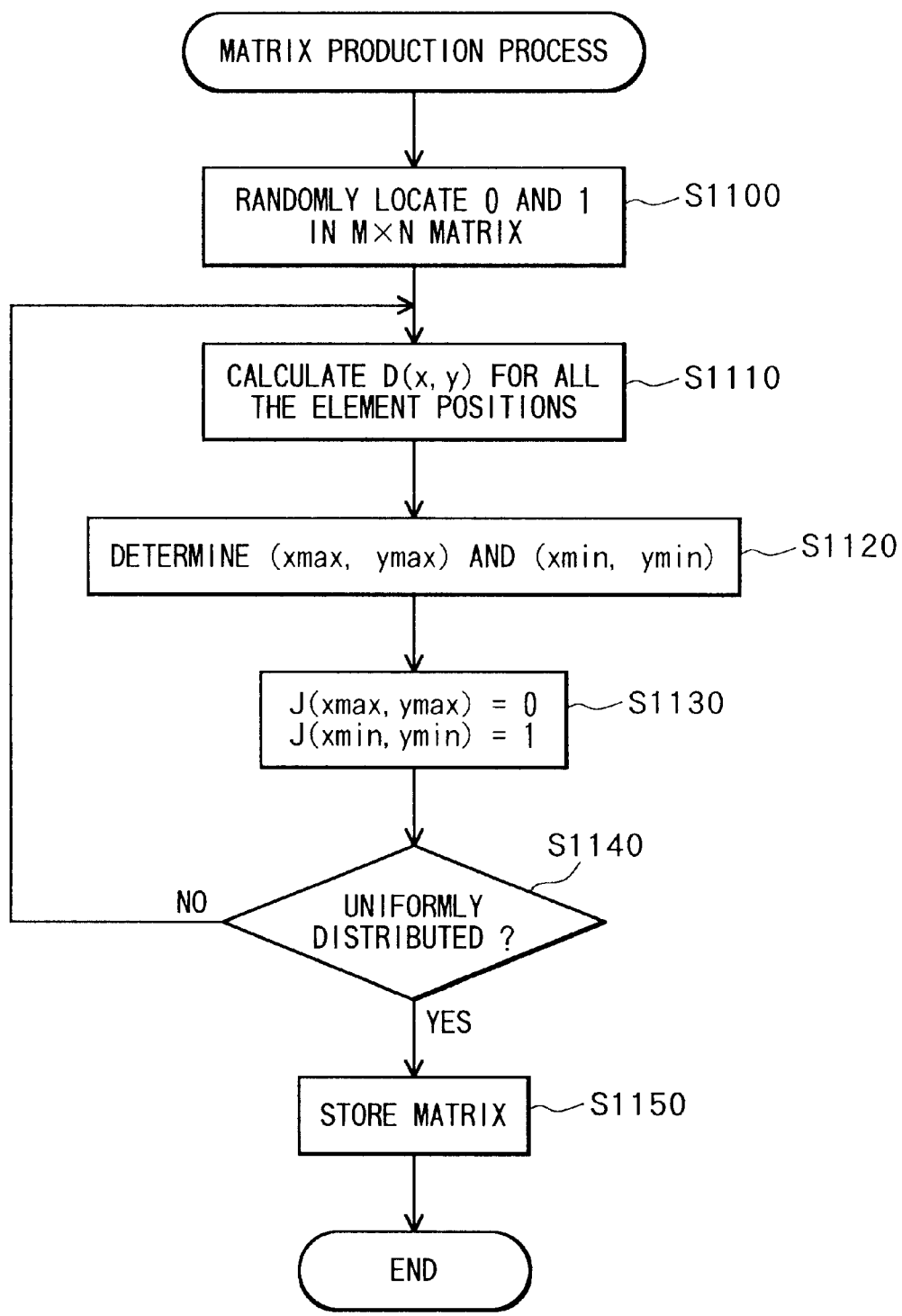
FIG. 11 is a flowchart indicative of a process for producing a printing prohibiting mask A() through a blue noise mask production method.

In order to produce such a multilevel threshold matrix with "0"-assigned printing prohibited elements, a multilevel threshold matrix Matm() having three or more kinds of threshold values is first produced based on the bilevel matrix Mat2() produced as described above in the blue noise mask production method of FIG. 11. In order to produce the multilevel threshold matrix Matm(), the first value of a first value-assigned element, that is located in a tightest cluster where the first value-assigned elements are tightly collected, is replaced with the second value. The total number of the first threshold values, left in the matrix prior to the replacement operation, is set as a multilevel threshold value at a corresponding element position in a multilevel threshold matrix T() be produced. Then, this replacement-and-setting operation is repeated. Then, again for the original bilevel threshold matrix Mat2(), the second value of a second value-assigned element, that is located in a largest void where the first value-assigned elements are thinly dispersed, is replaced with the first value. The total number of the first values, remaining in the matrix after the replacement operation, is set as a multilevel threshold value in a corresponding element position of the multilevel threshold matrix to be produced. Then, this replacement-and-setting operation is repeated. Thus, the multilevel threshold matrix is prepared to have three or more threshold values distributed.

This process will be described below in greater detail with reference to FIGS. 13 and 14.

According to this process, a multilevel threshold matrix Matm() is produced based on the bilevel threshold matrix Mat2() which is produced through the process of FIG. 11 and which is comprised of the two different values "0" and "1". The multilevel threshold matrix Matm() to be produced is comprised of a plurality of different threshold values.

It is noted that even when the numbers of the majority elements and the minority elements are changed in the following processes of FIGS. 13 and 14, the values ("0" and "1") indicated by the majority values and the minority values will not change.

Figure 13:
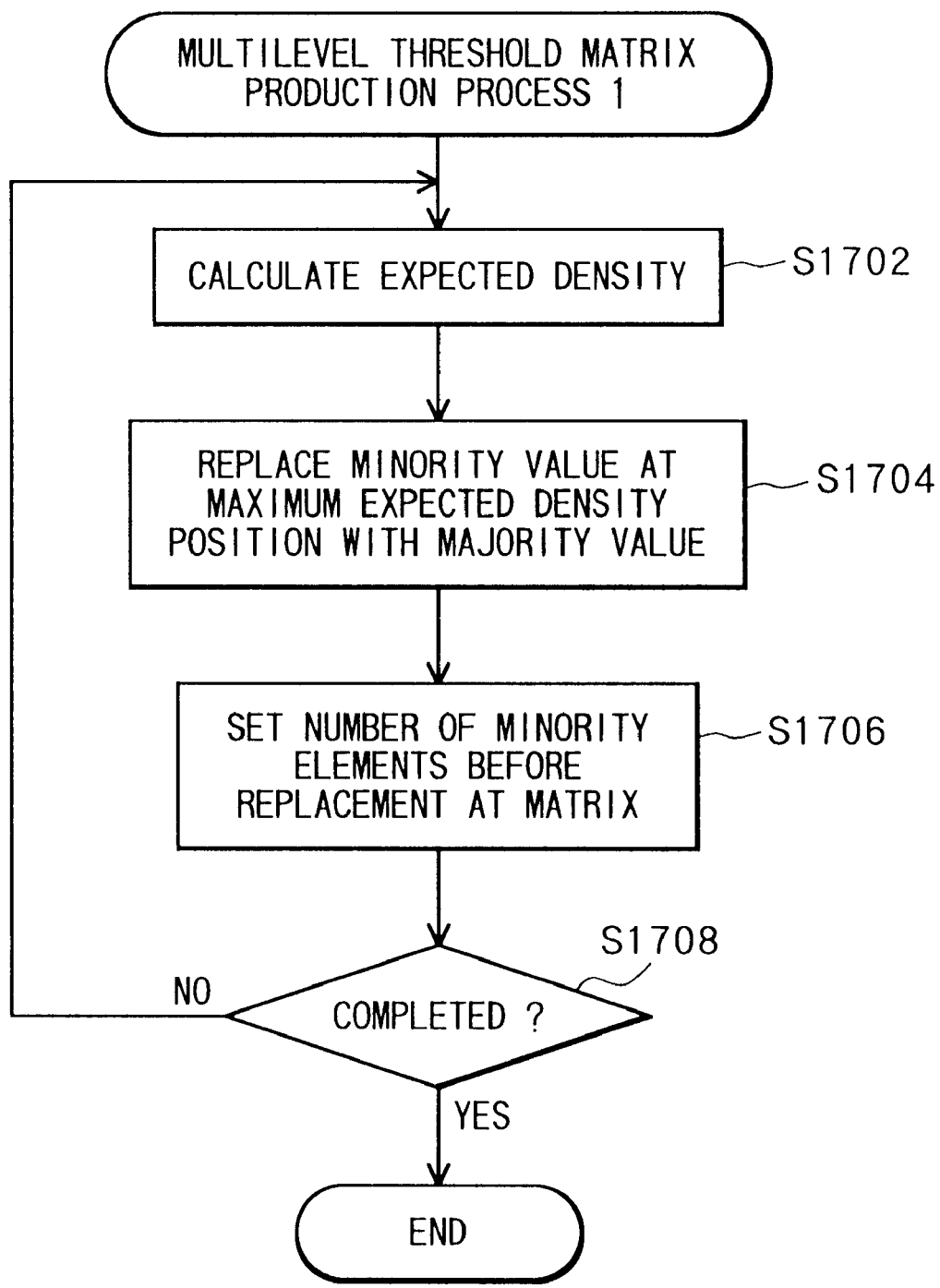
FIG. 13 is a flowchart of a part of a process for producing each of the dither matrices DmC'(), DmY'(), and DmM'(), and the threshold matrix T() through the blue noise mask production method.

First, the process of FIG. 13 is attained as described below.

When the process of FIG. 13 is started, expected density values D(x, y) are calculated in S1702 for all the elements (x, y) of the bilevel threshold matrix Mat2() as produced through the process of FIG. 11. Then, the CPU 12 selects in S1704 a minority element (x,y) that has a minority value and that has its expected density value D(x,y) highest among all the minority elements in the matrix Mat2(). This element (x, y) is considered as a minority element as located in a largest cluster of minority elements, i.e., in a tightest grouping of minority elements. The element value J(x, y) of this element (x, y) is then replaced with a majority value. Then, in S1706, a corresponding element position (x, y) of a multilevel threshold matrix Matm(), as prepared in the memory 19 to have M×N element positions, is set with a value equal to the total number of minority elements left in the bilevel threshold matrix Mat2() before the replacement operation of S1704 is attained.

Next, it is judged in S1708 whether or not any minority elements still remain in the bilevel threshold matrix Mat2(). When any minority elements remain in the matrix Mat2() (no in S1708), the processes of S1702–S1706 are repeated. Thus, as the processes of S1702–S1706 are repeated, elements of the multilevel threshold matrix Matm() are set one by one with threshold values. As the processes of S1702–S1706 are repeated, the amount of the threshold value set in S1706 is decreased one by one. When no minority elements remain in the bilevel matrix Mat2() (yes in S1708), the process ends. At this time, all the elements in the bilevel matrix Mat2() are set with the majority values.

Thus, according to the process of FIG. 13, threshold values are set to the multilevel threshold matrix Matm() at element positions as corresponding to the minority elements in the bilevel matrix Mat2().

Figure 14:
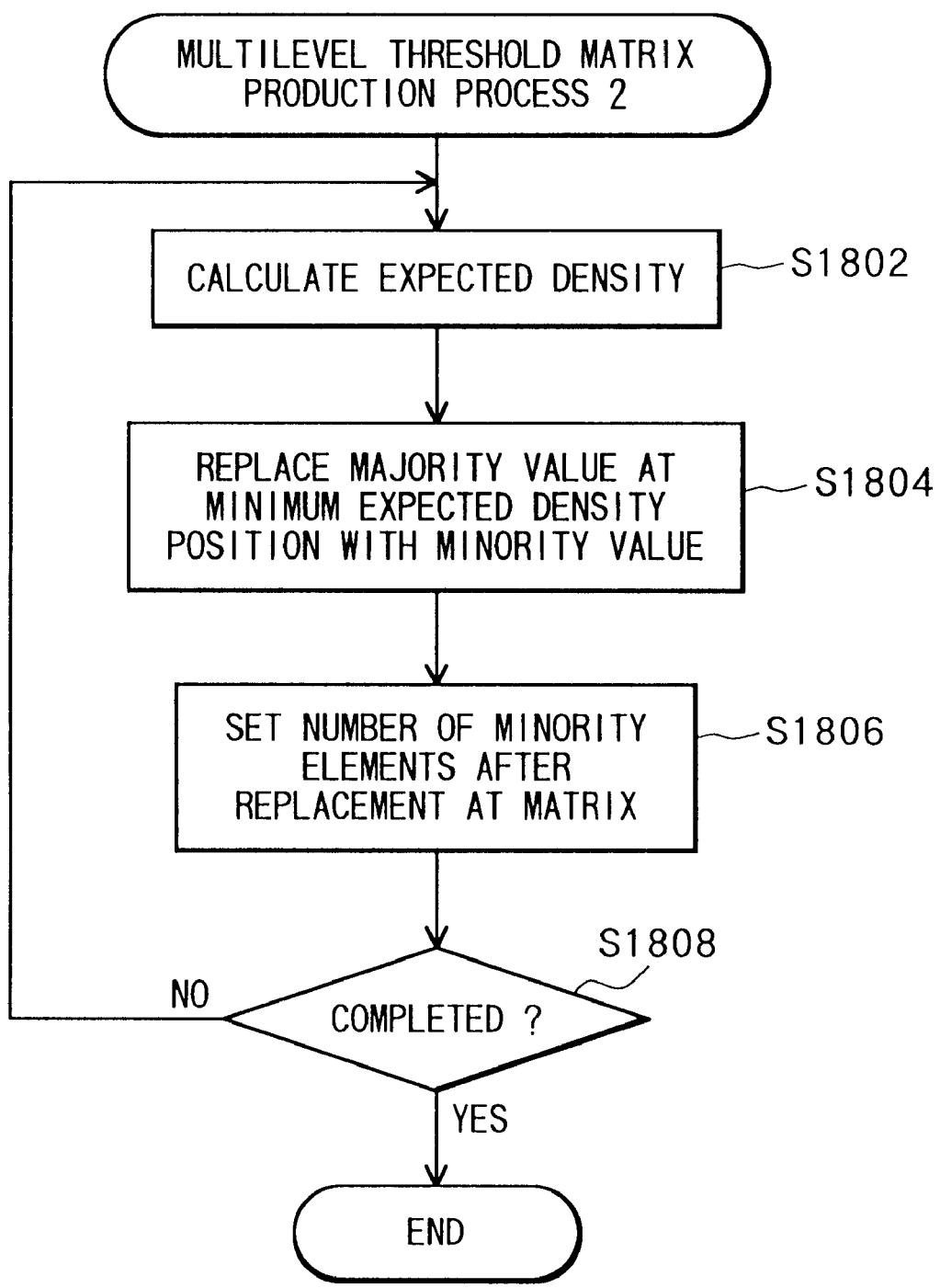
FIG. 14 is a flowchart of a remaining part of the process for producing each of the dither matrices DmC'(), DmY'(), and DmM'(), and the threshold matrix T() through the blue noise mask production method.

Then, the process of FIG. 14 is performed for successively setting threshold values to element positions in the multilevel threshold matrix Matm() that are not yet determined in the process of FIG. 13. That is, threshold values are set to the multilevel threshold matrix Matm() at element positions as corresponding to majority elements in the bilevel matrix Mat2().

When the process of FIG. 14 is started, expected density values D(x, y) are calculated in S1802 for all the elements of the bilevel threshold matrix Mat2(). This bilevel threshold matrix Mat2() is the matrix Mat2() originally produced through the process of FIG. 11 and stored in the memory portion 20. Accordingly, the matrix Mat2(), subjected to the process of FIG. 14, is not the matrix which is obtained through the process of FIG. 13 to have only the majority values.

Then, the CPU 12 selects in S1804 a majority element (x,y) that has a majority value and that has its expected density value D(x,y) as lowest among all the majority elements in the matrix Mat2(). This element (x, y) is considered as a majority element located in a largest void for minority elements, i.e., in a largest space between the thinly dispersed minority elements. The majority element value of this element (x, y) is then replaced with the minority value.

Then, in S1806, a corresponding position (x, y) in the multilevel threshold matrix Matm() is set with a value equal to the total number of the minority elements remaining in the bilevel threshold matrix Mat2() after the replacement operation of S1804 is attained.

Next, it is judged in S1808 whether or not any majority elements remain in the bilevel threshold matrix Mat2(). When any majority elements still remain in the matrix mat2() (no in S1808), the processes of S1802–S1806 are repeated. Thus, as the processes of S1802–S1806 are repeated, elements in the multilevel threshold matrix Matm() are set one by one with threshold values. As the processes of S1802–S1806 are repeated, the amount of the threshold value set in S1806 is increased one by one. When no majority elements remain in the bilevel matrix Mat2() (yes in S1808), the process ends.

Thus, according to the process of FIG. 14, threshold values are set to the multilevel threshold matrix Matm() at element positions corresponding to the majority elements in the bilevel matrix Mat2().

When the process of FIG. 14 is completed, all the element positions in the multilevel matrix Matm() corresponding to all the element positions in the bilevel matrix Mat2() are set with threshold values. The total M×N number of different integers, in a range of 1 to M×N, are distributed in all the M×N number of elements in the matrix Matm(). Thus, the multilevel threshold matrix Matm() is produced. The number of the kinds of threshold values distributed in the matrix is equal to the total number of its elements.

Then, a table is prepared to list therein all the element positions of the matrix Matm() and their corresponding threshold values in a predetermined order. For example, the table may list all the element positions and their corresponding threshold values in an order of the amount of the threshold values from the minimum to the maximum. The table may list all the element positions and their corresponding threshold values in the reversed order, that is, in an order of the amount of the threshold value from the maximum to the minimum. Then, several elements, successively arranged in the table from its leading end, are retrieved. The total number of the retrieved elements is equal to the total number of printing prohibited positions desired to be obtained. Then, the retrieved elements are reset with the printing prohibiting threshold value of "0" or the printing prohibiting marks "X". Thus, the retrieved elements are set as the printing prohibited positions. The thus obtained matrix may be used as each of the dither matrices DmC'(), DmM'(), and DmY'(), and the threshold matrix T().

It is noted that the retrieved elements may be set with the printing prohibiting mark "X", and the remaining elements may all be set with the printing enabling mark "O". In this case, the matrix A() shown in FIG. 4(a) can be produced.

It is also noted that the multilevel threshold matrix Matm() produced by the process of FIGS. 13 and 14 may be used as the matrix A'() of FIG. 7(a). That is, elements assigned with values "1" through "16" will serve as printing prohibited position candidates.

In the first and second embodiments, the error diffusion method is used for converting the input density into a binary value while distributing the obtained error into unprocessed neighboring pixels. However, other various types of error distribution binary conversion methods can be used. In any of the error distribution binary conversion methods, densities of a plurality of pixels are successively converted into binary values through comparing the subject pixel densities with a predetermined threshold value, while binary conversion errors, defined between the original pixel densities and the binary values, are affected onto unprocessed neighboring pixels. According to the present invention, some printing prohibited positions are previously determined.

When a minimized average error method is employed, for example, the image conversion process is performed as described below with reference to FIGS. 15 and 16.

Figure 15:
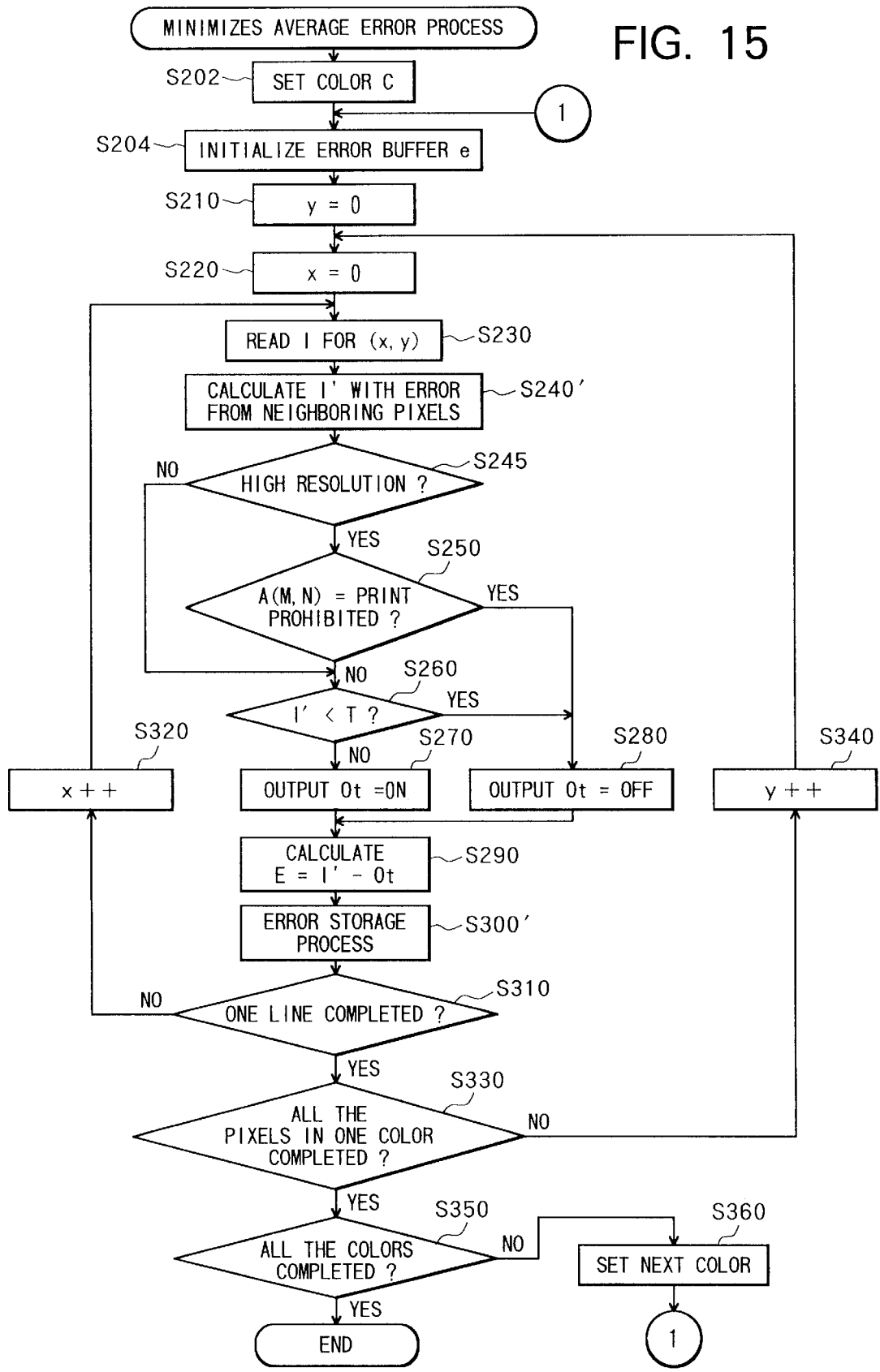
FIG. 15 is a flowchart of a minimized average error method-employed image conversion process according to another modification of the present invention.

The minimized average error method-employed image conversion process shown in FIG. 15 is the same as the error diffusion image conversion process of FIG. 2 except that the input density modification process of S240 is replaced with another input density modification process of S240' and that the error distribution process of S300 is replaced with an error storage process of S300'.

That is, according to the minimized average error method, before being converted into a binary value, the input density of each pixel is modified by fractions of errors distributed from already-processed twelve neighboring pixels. That is, the input density I of the subject pixel (x, y) is modified in S240' through receiving binary conversion errors that have been produced during already-performed binary conversion processes onto twelve neighboring pixels (x+i, y+j) and that have been stored in the corresponding memory locations in the error buffer 16. The input density I of the subject pixel (x, y) is added with the binary conversion errors in a weighted basis defined by a predetermined error diffusion matrix Cmat() shown in FIG. 16.

In the matrix Cmat(), * indicates a subject pixel position (x, y). Each value in the matrix indicates a coefficient to be multiplied with an error e(x+i, y+j), which is obtained at a corresponding neighboring pixel (x+i, y+j) that is located relative to the subject pixel (x, y) as shown in the matrix, the coefficient-multiplied error e(x+i, y+j) being added to the subject pixel density I. Thus, error fractional portions distributed from already-processed neighboring twelve pixels (x+i, y+j) are added to the input density I. For example, the input density I of the subject pixel (x, y) receives a $\frac{7}{48}^{th}$ part of an error e(x−1, y) obtained at a pixel (x−1, y) that is located immediately preceding the subject pixel (x, y) on the same pixel line.

Thus, the input density I of the subject pixel (x, y) is modified into a modified density I' through the following formula:

$$I' = I + (1/48) \times e(x-2, y-2)$$
$$+ (3/48) \times e(x-1, y-2)$$
$$+ (5/48) \times e(x, y-2)$$
$$+ (3/48) \times e(x+1, y-2)$$
$$+ (1/48) \times e(x+2, y-2)$$
$$+ (3/48) \times e(x-2, y-1)$$
$$+ (5/48) \times e(x-1, y-1)$$
$$+ (7/48) \times e(x, y-1)$$
$$+ (5/48) \times e(x+1, y-1)$$
$$+ (3/48) \times e(x+2, y-1)$$
$$+ (5/48) \times e(x-2, y)$$
$$+ (7/48) \times e(x-1, y)$$

The modified value I' will be used in the comparing process of S260 in the same manner as in the first embodiment. A binary conversion error E(x, y) is also calculated in S290 in the same manner as in the error diffusion image conversion process of FIG. 2.

The error storage process of S300' will be described below. In this error storage process, the produced binary conversion error E(x, y) is merely stored into the corresponding memory location (x, y) of the buffer memory 16 as a corresponding error e(x, y).

It is noted that the dither matrix-employed error diffusion image conversion method of FIG. 10 can also be modified to employ the minimized average error method. That is, the processes of S240 and S300 in FIG. 10 may be modified into S240' and S300' in the same manner as described above.

In the above-described embodiments, the binary conversion process is achieved in the computer system side, and the obtained pseudo-halftone image data is outputted from the display 22 or the color printer 24. However, the binary conversion process can be achieved in the printer side.

Figure 17:
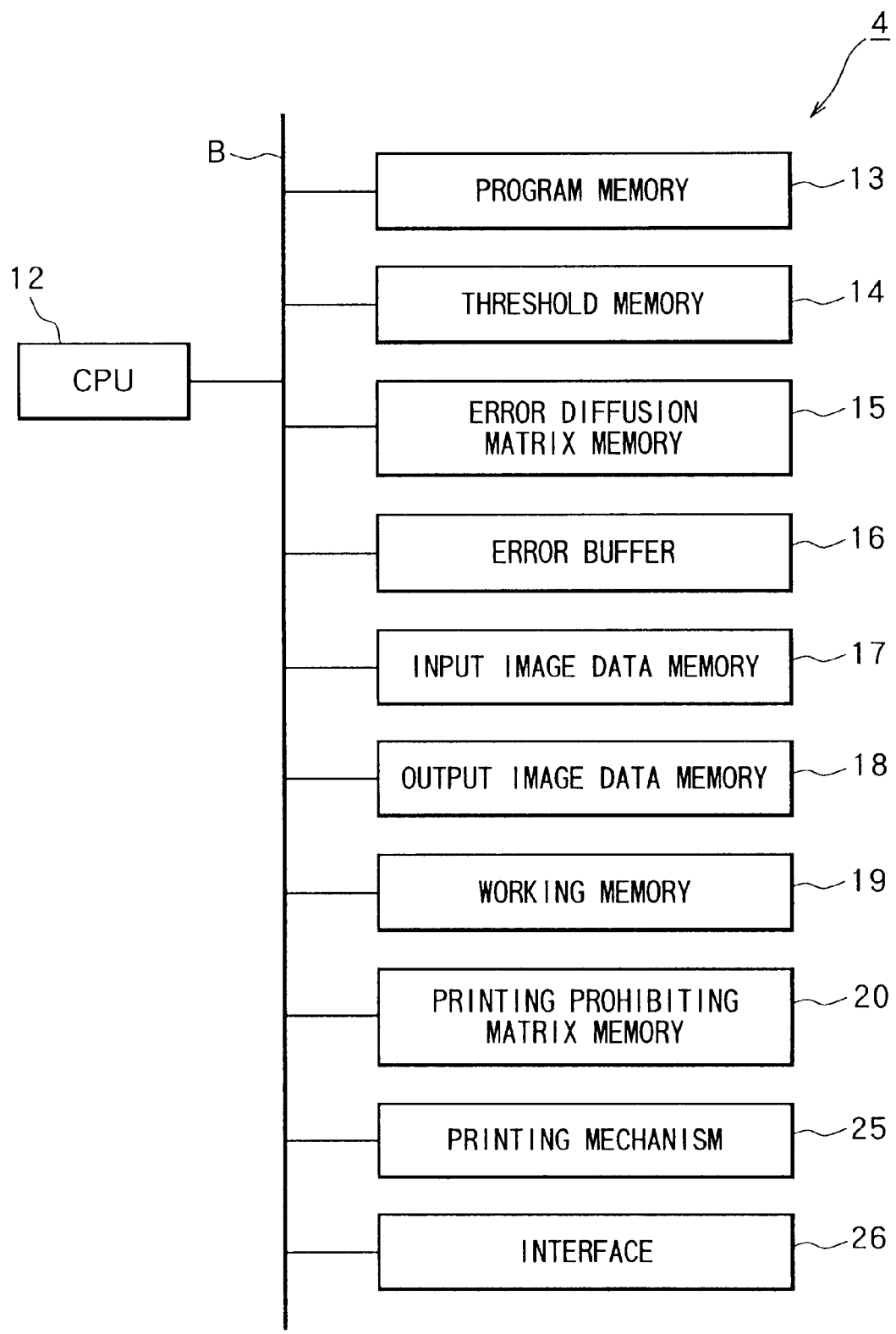
FIG. 17 is a block diagram of a color printer according to still another modification of the present invention.

For example, a color printer 4 can be constructed as shown in FIG. 17 so that the color printer 4 can convert inputted continuous tone color images into pseudo-halftone color images. The numerals in FIG. 17 the same as those in FIG. 1 correspond to the same or like portions in the device 2 of FIG. 1.

The color printer 4 is therefore constructed from: a CPU 12; a program memory 13 constructed from a ROM; a threshold storage portion 14 constructed from a RAM; an error distribution matrix storage memory 15 constructed from another RAM; an error buffer 16 also constructed from another RAM; an input image memory 17 also constructed from another RAM; an output image memory 18 constructed from still another RAM; a working memory 19 constructed from another RAM; a printing prohibiting matrix memory 20 constructed from another RAM; a printing mechanism 25; and an interface 26.

The printing mechanism 25 is constructed from a printing head such as an ink jet print head for ejecting ink of cyan, magenta, and yellow, and a mechanism for feeding a paper relative to the ink jet print head. The interface 26 is for transmitting data to and receiving data from a host computer (not shown).

With this structure, the color printer 4 receives character code data and command data via the interface 26 from the host computer. The color printer 4 can convert a continuous tone color image represented by the character code data into a pseudo-halftone color image through the binary conversion process in the same manner as described above. Then, the color printer 4 controls the printing mechanism 25 to print the obtained pseudo-halftone color image. Thus, the color printer 4 can obtain advantages the same as those of the above-described embodiments.

While the invention has been described in detail with reference to specific embodiments thereof, it would be apparent to those skilled in the art that various changes and modifications may be made therein without departing from the spirit of the invention.

As described above, according to the above-described embodiments and modifications, some pixel positions are previously determined as printing-prohibited pixels which will be compulsively turned OFF during the image conversion process. That is, for each of a plurality of color components, pixels, other than the predetermined printing prohibited pixels, in an inputted continuous tone color image are successively converted into binary values of ON or OFF through comparing the color component values with a threshold value. The printing prohibited pixels are compulsively turned OFF. A pseudo-halftone color image is obtained based on the binary values produced at each color component. Ink of each color component will be selectively ejected in correspondence with the ON or OFF state of each pixel at the color component. It is therefore possible to limit the amount of ink to be ejected to print the thus produced pseudo-halftone color image.

It is noted that the threshold value may be a predetermined fixed value. The threshold value may be retrieved from a plurality of threshold values distributed in a threshold matrix. The threshold value may be retrieved from a plurality of threshold values distributed in a blue noise mask. A binary conversion error obtained during this binary conversion operation may be affected to neighboring unprocessed pixels.

In the above-described binary conversion process, the density of the original continuous tone image is not decreased. The printing prohibited pixel positions, to be compulsively turned OFF, are merely determined previously. In a region desired to be printed black, all the color components C, M, and Y will be accurately turned ON at each of pixel positions other than the predetermined printing prohibited pixel positions. It is therefore possible to prevent the increase in the ink amount to be ejected onto the sheet of paper. It is possible to effectively limit the amount of ejected ink while not deteriorating the image quality through preventing occurrence of cockling or ink dropping phenomenon.

The printing prohibited pixel positions may be previously determined so as to maintain fixed the rate of the number of the printing prohibited pixel positions with respect to the entire pixel positions in the continuous tone image. It is, however, unnecessary to fixedly determine the printing prohibited pixel positions. It may be possible to change the distribution rate of the printing prohibited pixels relative to the entire pixels in accordance with the density of the original image to be converted. In the second embodiment, the printing prohibited pixel distribution rate is changed in accordance with a density state of a subject pixel to be converted or a density state of pixels located in the neighborhood of the subject pixel. The printing prohibited pixel distribution rate is increased for a high density region. The printing prohibited pixel distribution rate is decreased for a low density region.

The printing prohibited pixel distribution rate may be adjusted to the same values for all the color components. Or, the printing prohibited pixel distribution rate may be adjusted for each color component in accordance with a density state at that color component. For example, the printing prohibited pixel distribution rate for one color component may be increased at a region that presents a high density for that color component even though that region presents low density for other color components. The printing prohibited pixel distribution rate for one color component may be decreased at a region that presents a low density for that color component even though that region presents high density for other color components.

Thus, the same amount of the printing prohibited pixel distribution rate may be used for all the color components. Or, the printing prohibited pixel distribution rate may be determined differently for the respective color components.

In the embodiments, information on the above-described printing prohibited pixel positions is provided as a printing prohibiting matrix. In the printing prohibiting matrix, the printing prohibited pixels may be located in a random manner or may be produced through the blue noise mask production method. A resultant binary color image will not suffer from any undesirable textures.

Representative examples of the color components include cyan, magenta, and yellow.

Data of the above-described binary color image conversion method is stored as data of a program, for example, which is executed by a computer system. This program data may be previously stored in a data storage medium such as a floppy disk, a magnetooptic disk, or a CD-ROM. The program may be loaded into the computer system as required. The program may be stored in a data storage medium such as a ROM or a back up RAM. The data storage medium is installed into the computer system.

What is claimed is:

1. A method for converting continuous tone color image data into pseudo-halftone color image data, the method comprising the steps of:

successively judging whether or not each of a plurality of pixels, arranged in a continuous tone color image, is located at a predetermined printing-prohibited pixel position, while comparing, for each of a plurality of different color components, density data of at least one pixel other than that located at the printing-prohibited pixel position, with a threshold value; and compulsively converting the density value into the binary value of OFF when the subject pixel is judged to be located at the predetermined printing-prohibited pixel position and converting the density value into a binary value of either ON or OFF based on the compared result when the subject pixel is judged not to be located at the predetermined printing-prohibited pixel position, wherein each pixel is subjected to the judging-and-comparing step using a matrix indicative of the predetermined printing-prohibited pixel position and the matrix is formed with a plurality of elements each being indicative of either a printing prohibited position or a printing allowed position, and each element indicative of the printing allowed position is assigned with a first kind of threshold value, and each element indicative of the printing prohibited position is assigned with a second kind of threshold value discriminatable from the first kind of threshold value, wherein the judging-and-comparing step includes the steps of:

retrieving a threshold value from one element corresponding to the subject pixel;

judging whether the retrieved threshold value is of the first kind or the second kind;

comparing the density value of the subject pixel with the retrieved threshold value when the threshold value is of the first kind; and compulsively converting the density value into the binary value of OFF when the threshold value is of the second kind.

2. A method as claimed in claim 1, wherein a binary conversion error defined between the density value of the subject pixel and the binary value is affected onto neighboring pixels.

3. A method as claimed in claim 2, wherein all the pixels of the continuous tone image are successively subjected to the judging-and-comparing process, further comprising the step of diffusing fractional portions of the binary conversion error, obtained for the subject pixel, to neighboring pixels that have not yet been processed.

4. A method as claimed in claim 2, wherein all the pixels of the continuous tone image are successively subjected to the judging-and-comparing process, further comprising the step of affecting fractional portions of binary conversion errors, obtained for already-processed neighboring pixels, to the density value of the subject pixel.

5. A method as claimed in claim 1, wherein the density data of all the pixels is compared with a predetermined single threshold value.

6. A method as claimed in claim 1, wherein the density data of each pixel is compared with a threshold value which is determined dependent on a position of the pixel.

7. A method as claimed in claim 1, wherein the density data of each pixel is compared with a threshold value which is retrieved from a dither matrix.

8. A method as claimed in claim 1, wherein the density data of each pixel is compared with a threshold value which is retrieved from a blue noise matrix.

9. A method as claimed in claim 1, wherein a ratio of the number of the predetermined printing-prohibited pixel positions with respect to the total number of the pixel positions of the continuous tone image is predetermined to be fixed.

10. A method as claimed in claim 1, wherein the possibility that each pixel is judged to be located on the predetermined printing-prohibited pixel position is changeable dependent on the density value of the subject pixel.

11. A method as claimed in claim 10, wherein the possibility that each pixel is judged to be located on the predetermined printing-prohibited pixel position is changeable dependent on the density value of the subject pixel for each color component.

12. A method as claimed in claim 1, wherein the matrix is formed with a plurality of elements which include a predetermined number of printing prohibited elements, and wherein the judging-and-comparing step judges whether or not each pixel position corresponds to one of the printing prohibited element positions.

13. A method as claimed in claim 1, further comprising the step of adjusting a ratio of the number of the printing prohibited position-indicated elements with respect to the total number of the elements dependent on the density value of each pixel, and wherein the judging-and-comparing step judges which element each pixel position corresponds to.

14. A method as claimed in claim 1, wherein the judging-and-comparing step further includes the step of adjusting a ratio of the number of the first kind of threshold value-assigned elements with respect to the number of the second kind of threshold value-assigned elements dependent on the density value of the subject pixel.

15. A method as claimed in claim 1, wherein the plurality of color components include cyan, magenta, and yellow.

16. A program storage medium for storing data of a program indicative of a process for converting continuous tone color image data into pseudo-halftone color image data, the program comprising:

a program of successively judging whether or not each of a plurality of pixels, arranged in a continuous tone color image, is located at a predetermined printing-prohibited pixel position, while comparing, for each of a plurality of different color components, density data of at least one pixel other than that located at the printing-prohibited pixel position, with a threshold value; and a program of compulsively converting the density value into the binary value of OFF when the subject pixel is judged to be located at the predetermined printing-prohibited pixel position and converting the density value into a binary value of either ON or OFF based on the compared result when the subject pixel is judged not to be located at the predetermined printing-prohibited pixel position, wherein each pixel is subjected to the judging-and-comparing program using a matrix indicative of the predetermined printing-prohibited pixel position and the matrix is formed with a plurality of elements each being indicative of either a printing prohibited position or a printing allowed position, and each element indicative of the printing allowed position is assigned with a first kind of threshold value, and each element indicative of the printing prohibited position is assigned with a second kind of threshold value discriminatable from the first kind of threshold value, wherein the judging-and-comparing includes:
a program of retrieving a threshold value from one element corresponding to the subject pixel;
a program of judging whether the retrieved threshold value is of the first kind or the second kind;
a program of comparing the density value of the subject pixel with the retrieved threshold value when the threshold value is of the first kind; and
a program of compulsively converting the density value into the binary value of OFF when the threshold value is of the second kind.

17. A printer for converting continuous tone color image data into pseudo-halftone color image data and for printing the pseudo-halftone color image, the printer comprising:

means for successively judging whether or not each of a plurality of pixels, arranged in a continuous tone color image, is located at a predetermined printing-prohibited pixel position, while comparing, for each of a plurality of different color components, density data of at least one pixel other than that located at the printing-prohibited pixel position, with a threshold value;

means for compulsively converting the density value into the binary value of OFF when the subject pixel is judged to be located at the predetermined printing-prohibited pixel position and converting the density value into a binary value of either ON or OFF based on the compared result when the subject pixel is judged not to be located at the predetermined printing-prohibited pixel position; and means for printing a pseudo-halftone color image based on the binary value obtained for each pixel for each color component, wherein each pixel is subjected to a judging-and-comparing operation using a matrix indicative of the predetermined printing-prohibited pixel position and the matrix is formed with a plurality of elements each being indicative of either a printing prohibited position or a printing allowed position, and each element indicative of the printing allowed position is assigned with a first kind of threshold value, and each element indicative of the printing prohibited position is assigned with a second kind of threshold value discriminatable from the first kind of threshold value, wherein the judging-and-comparing,, means includes:
means for retrieving a threshold value from one element corresponding to the subject pixel;
means for judging whether the retrieved threshold value is of the first kind or the second kind;
means for comparing the density value of the subject pixel with the retrieved threshold value when the threshold value is of the first kind; and
means for compulsively converting the density value into the binary value of OFF when the threshold value is of the second kind.

18. A method for converting continuous tone color image data into pseudo-halftone color image data, the method comprising the steps of:

successively comparing, for each of a plurality of different color components, density data of a plurality of pixels arranged on a continuous tone color image with a threshold value, while judging whether or not a location of the subject pixel is at a predetermined printing prohibited position; and converting the density data into a binary value of either ON or OFF based on the compared result, while compulsively converting the density data of some pixels, each of which is located at the predetermined printing prohibited position, wherein each pixel is subjected to the judging-and-comparing step using a matrix indicative of the predetermined printing-prohibited pixel position and the matrix is formed with a plurality of elements each being indicative of either a printing prohibited position or a printing allowed position, and each element indicative of the printing allowed position is assigned with a first kind of threshold value, and each element indicative of the printing prohibited position is assigned with a second kind of threshold value discriminatable from the first kind of threshold value, wherein the comparing-and-judging step includes the steps of:
retrieving a threshold value from one element corresponding to the subject pixel;
judging whether the retrieved threshold value is of the first kind or the second kind;
comparing the density value of the subject pixel with the retrieved threshold value when the threshold value is of the first kind; and
compulsively converting the density value into the binary value of OFF when the threshold value is of the second kind.

19. A method as claimed in claim 18, wherein the density data of each pixel is compared with a predetermined threshold value.

20. A method as claimed in claim 18, wherein the density data of each pixel is compared with a corresponding one of a plurality of threshold values arranged in a threshold matrix which is set for the corresponding color component.

21. A method as claimed in claim 18, wherein a binary conversion error defined between the density data of each pixel and the converted binary value is affected to its neighboring pixels.

22. A method as claimed in claim 18, wherein a distribution rate of the printing prohibited pixels predetermined to be turned OFF is fixed with respect to the entire pixels.

23. A method as claimed in claim 18, further comprising the step of adjusting the distribution rate of the predetermined printing prohibited pixels to be turned OFF relative to the entire pixels in accordance with a density of an original image to be converted.

24. A method as claimed in claim 23, wherein the distribution adjusting step includes the step of changing the distribution rate of the predetermined printing prohibited pixels to be turned OFF relative to the entire pixels for each color component in accordance with a density of the corresponding color component of the original image to be converted.

* * * * *